(12) United States Patent
Oliver et al.

(10) Patent No.: US 9,026,609 B2
(45) Date of Patent: May 5, 2015

(54) METHOD AND APPARATUS FOR COORDINATING MEDIA PRESENTATION ON DEVICES VIA AN INFORMATION SPACE

(75) Inventors: Ian Justin Oliver, Söderkulla (FI); Sergey Boldyrev, Söderkulla (FI); Sergey Balandin, Helsinki (FI); Timofey Turenko, Espoo (FI)

(73) Assignee: Nokia Corporation, Espoo (FI)

( * ) Notice: Subject to any disclaimer, the term of this patent is extended or adjusted under 35 U.S.C. 154(b) by 248 days.

(21) Appl. No.: 13/083,212

(22) Filed: Apr. 8, 2011

(65) Prior Publication Data
US 2011/0282968 A1 Nov. 17, 2011

Related U.S. Application Data

(60) Provisional application No. 61/322,669, filed on Apr. 9, 2010.

(51) Int. Cl.
| | |
|---|---|
| *G06F 15/16* | (2006.01) |
| *H04W 4/18* | (2009.01) |
| *G06F 9/50* | (2006.01) |
| *H04L 29/08* | (2006.01) |

(52) U.S. Cl.
CPC ............... *H04W 4/18* (2013.01); *G06F 9/5072* (2013.01); *H04L 67/306* (2013.01)

(58) Field of Classification Search
CPC . H04L 65/60; H04L 67/2823; H04L 65/4084; H04L 47/781
USPC .............................. 709/217–219; 725/36, 105
See application file for complete search history.

(56) References Cited

U.S. PATENT DOCUMENTS

| | | | |
|---|---|---|---|
| 6,390,371 B1 | 5/2002 | Armga et al. | |
| 7,796,190 B2 * | 9/2010 | Basso et al. | 348/445 |
| 2006/0161621 A1 | 7/2006 | Rosenberg | |
| 2007/0162927 A1 * | 7/2007 | Ramaswamy et al. | 725/36 |
| 2008/0061578 A1 | 3/2008 | Igoe | |
| 2009/0158365 A1 * | 6/2009 | Gordon et al. | 725/105 |

OTHER PUBLICATIONS

Authors: Claudio Gutierrez, Carlos A. Hurtado, and Alejandro Vaisman. IEEE Transactions on Knowledge and Data Engineering, vol. 19, No. 2. "Introducing Time into RDF" (Feb. 2007).*
Boldyrev, S., et al. "A Mechanism for Managing and Distributing Information and Queries in a Smart Space Environment" Nokia Research Centre, Retrieved: Feb. 4, 2011, pp. 1-10

(Continued)

*Primary Examiner* — Michael Won
*Assistant Examiner* — Karina J Garcia-Ching
(74) *Attorney, Agent, or Firm* — Alston & Bird LLP

(57) ABSTRACT

An approach is provided for coordinating media presentation on devices via an information space. In response to a request for presentation of media content, a media provision coordinating application retrieves from an information space raw media content corresponding to the request. The media provision coordinating application determines one or more first devices for pre-processing the raw media content and one or more second devices for presenting pre-processed media content based upon respective technical capabilities and availabilities of the first devices, the second devices, or a combination thereof, the first and second devices are connected to the information space.

20 Claims, 15 Drawing Sheets

(56) References Cited

OTHER PUBLICATIONS

Boldyrev, S., et al. "Network and Content Aware Information Management" Retrieved: Aug. 29, 2011, Institute of Electrical and Electronics Engineers, Inc. (2009), pp. 1-8.

International Search Report for corresponding PCT Application No. PCT/FI2011/050279, Sep. 5, 2011, pp. 1-6

Oliver, I., et al. "Dynamic, Localised Space Based Semantic Webs" Nokia Research Center, Retrieved: Aug. 29, 2011, pp. 1-6

Oliver, I., et al. "Personal Semantic Web Through a Space Based Computing Environment" Middleware for Semantic Web (2008), Retrieved: Aug. 29, 2011, pp. 1-14

Smirnov, A., et al. "Efficient Distributed Information Management in Smart Spaces" Third International Conference on Digital Information Management (2008), pp. 1-6

Written Opinion for corresponding PCT Application No. PCT/FI2011/050279, Sep. 5, 2011, pp. 1-7.

* cited by examiner

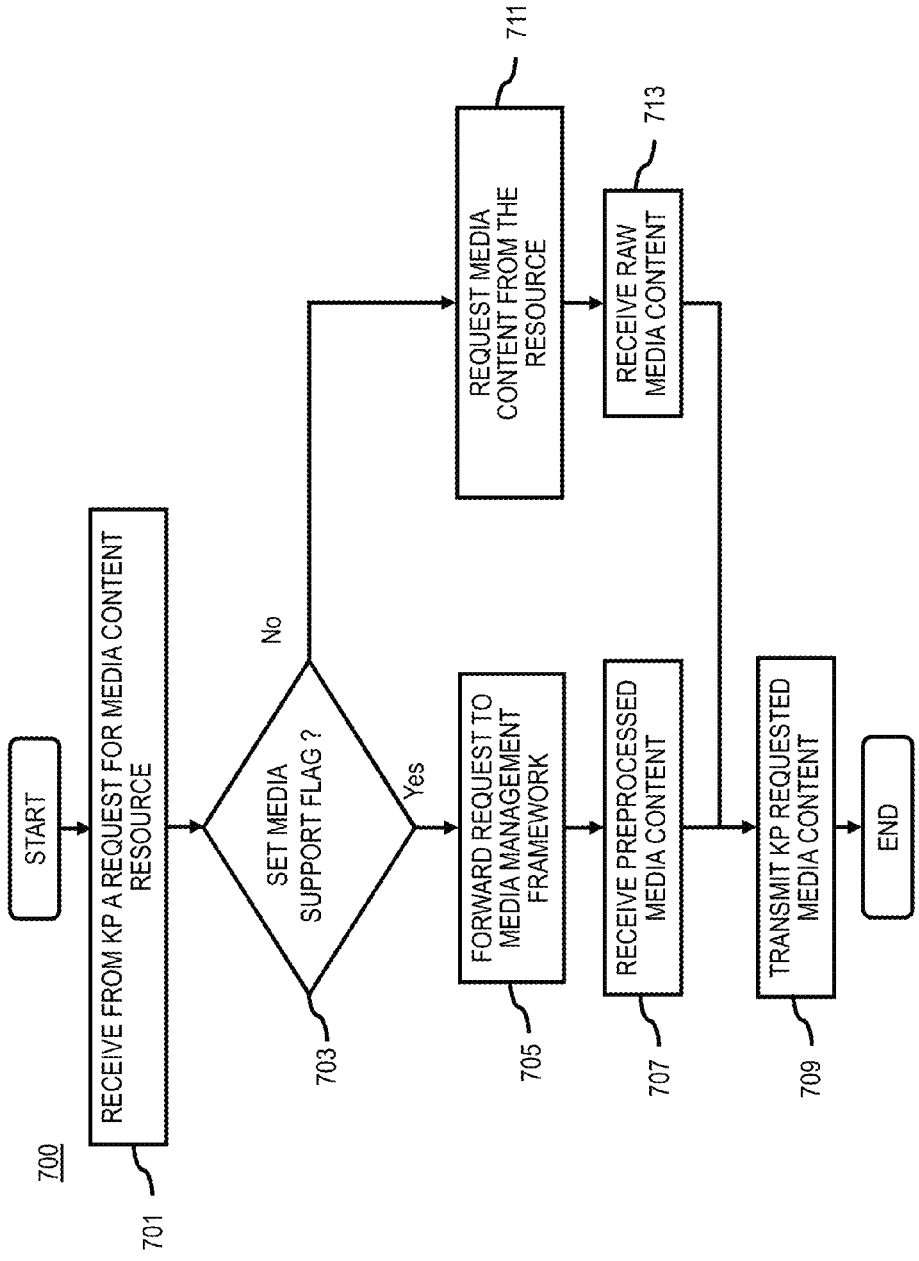

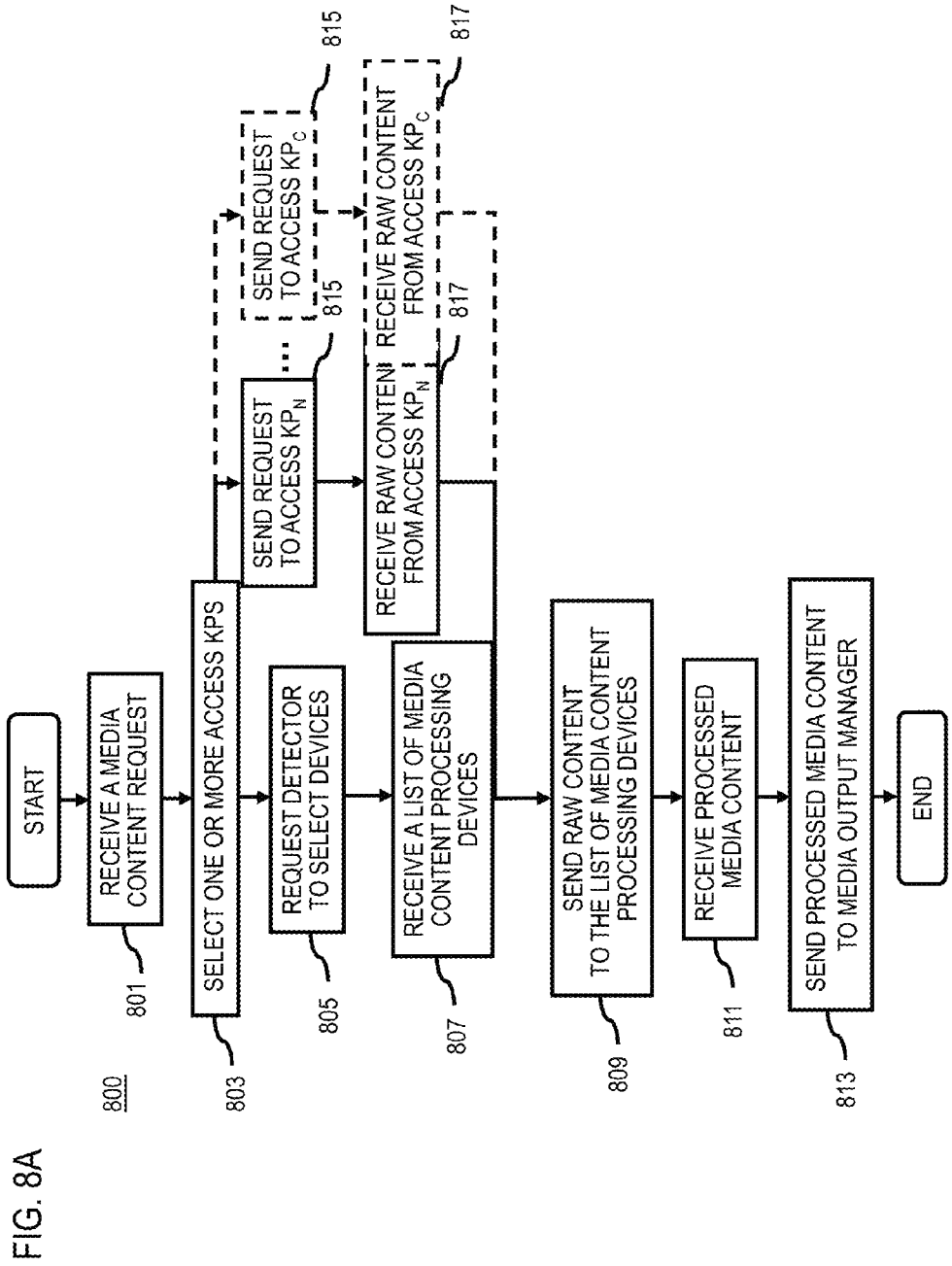

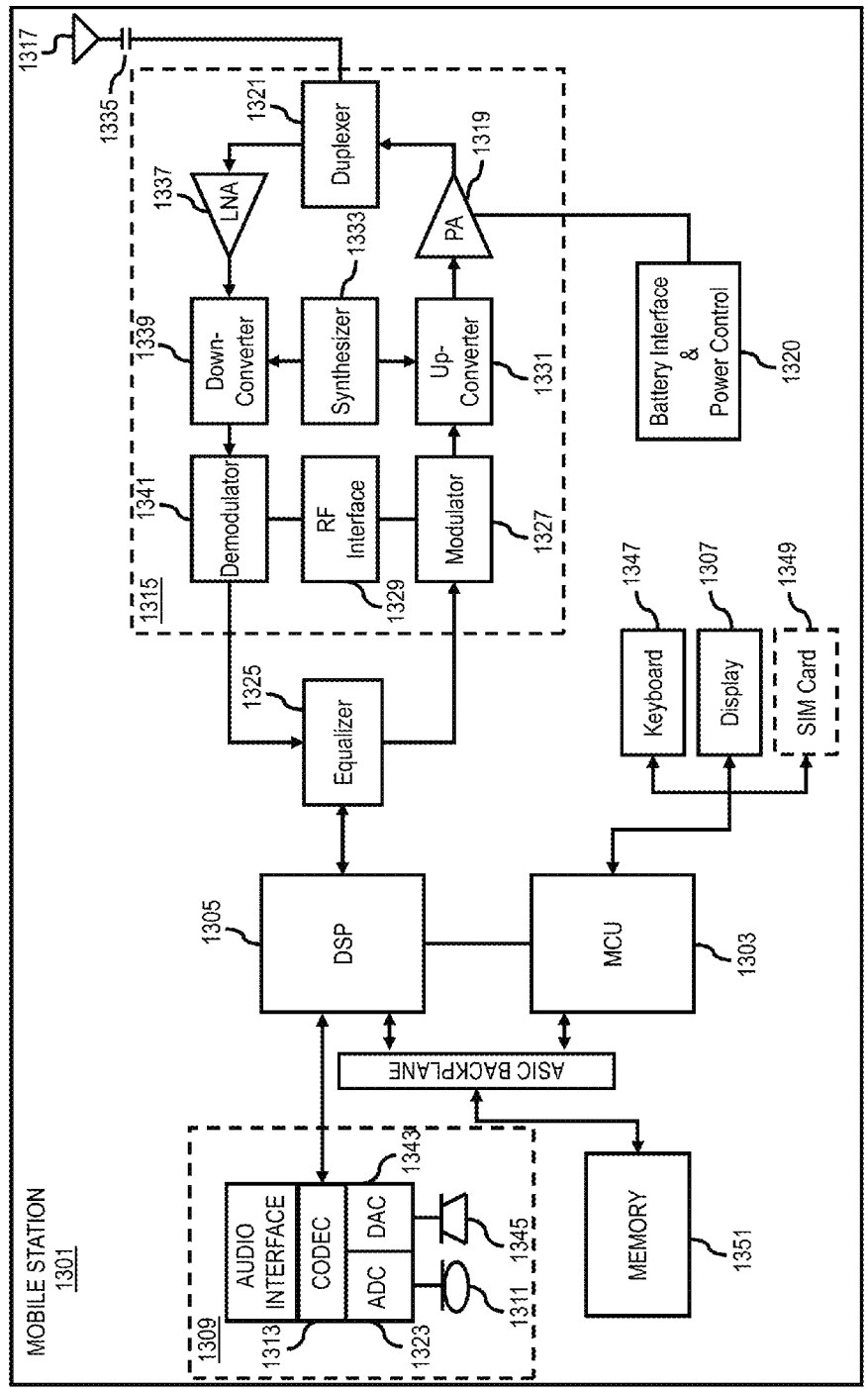

METHOD AND APPARATUS FOR
COORDINATING MEDIA PRESENTATION
ON DEVICES VIA AN INFORMATION SPACE

RELATED APPLICATIONS

This application claims the benefit of the earlier filing date under 35 U.S.C. §119(e) of U.S. Provisional Application Ser. No. 61/322,669 filed Apr. 9, 2010, entitled "Method and Apparatus for Coordinating Media Presentation on Devices via an Information Space," the entirety of which is incorporated herein by reference.

BACKGROUND

Service providers (e.g., wireless, cellular, Internet, content, social network, etc.) and device manufacturers are continually challenged to deliver value and convenience to consumers by, for example, providing compelling network services and advancing the underlying technologies. One area of interest has been in ways to provide a broad range of media services available via user devices everywhere and anytime. As users continue to demand media services across a variety of user devices at different locations, such as at home, at office, in a car, in a train, etc., more media access and device coordination are required in the physical world and on the web. However, not all user devices (e.g., a stand-alone video projector) are connected to a coordinating device to be controlled and/or coordinated for optimal user media services. In addition, not all user devices are connected to the web so as to be controlled and/or coordinated by a coordinating device for optimal user media services when the user moves from one location to another location. Existing web services try to address to the issue; nevertheless, lack of control and/or coordination mobility creates undesirable restrictions on user experience.

SOME EXAMPLE EMBODIMENTS

Therefore, there is a need for an approach for coordinating media presentation on devices via an information space.

According to one embodiment, a method comprises, in response to a request for presentation of media content, retrieving from an information space raw media content corresponding to the request. The method also comprises determining one or more first devices for pre-processing the raw media content and one or more second devices for presenting pre-processed media content based upon respective technical capabilities and availabilities of the first devices, the second devices, or a combination thereof, the first and second devices being connected to the information space.

According to another embodiment, an apparatus comprising at least one processor, and at least one memory including computer program code, the at least one memory and the computer program code configured to, with the at least one processor, cause, at least in part, the apparatus to, in response to a request for presentation of media content, retrieve from an information space raw media content corresponding to the request The apparatus is also caused to determine one or more first devices for pre-processing the raw media content and one or more second devices for presenting pre-processed media content based upon respective technical capabilities and availabilities of the first devices, the second devices, or a combination thereof, the first and second devices being connected to the information space.

According to another embodiment, a computer-readable storage medium carrying one or more sequences of one or more instructions which, when executed by one or more processors, cause, at least in part, an apparatus to, in response to a request for presentation of media content, retrieve from an information space raw media content corresponding to the request. The apparatus is also caused to determine one or more first devices for pre-processing the raw media content and one or more second devices for presenting pre-processed media content based upon respective technical capabilities and availabilities of the first devices, the second devices, or a combination thereof, the first and second devices being connected to the information space.

According to another embodiment, an apparatus comprises means for, in response to a request for presentation of media content, retrieving from an information space raw media content corresponding to the request. The apparatus also comprises means for determining one or more first devices for pre-processing the raw media content and one or more second devices for presenting pre-processed media content based upon respective technical capabilities and availabilities of the first devices, the second devices, or a combination thereof, the first and second devices being connected to the information space.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is a flowchart of a process for determining by a semantic information broker whether to process a request for media content from a knowledge processor, according to one embodiment;

FIG. 8A is a flowchart of a process for coordinating media content presentation in a smart space, according to one embodiment.

FIG. 13 is a diagram of a mobile terminal (e.g., handset) that can be used to implement an embodiment of the invention.

DESCRIPTION OF SOME EMBODIMENTS

A method and apparatus for coordinating media presentation on devices via an information space are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
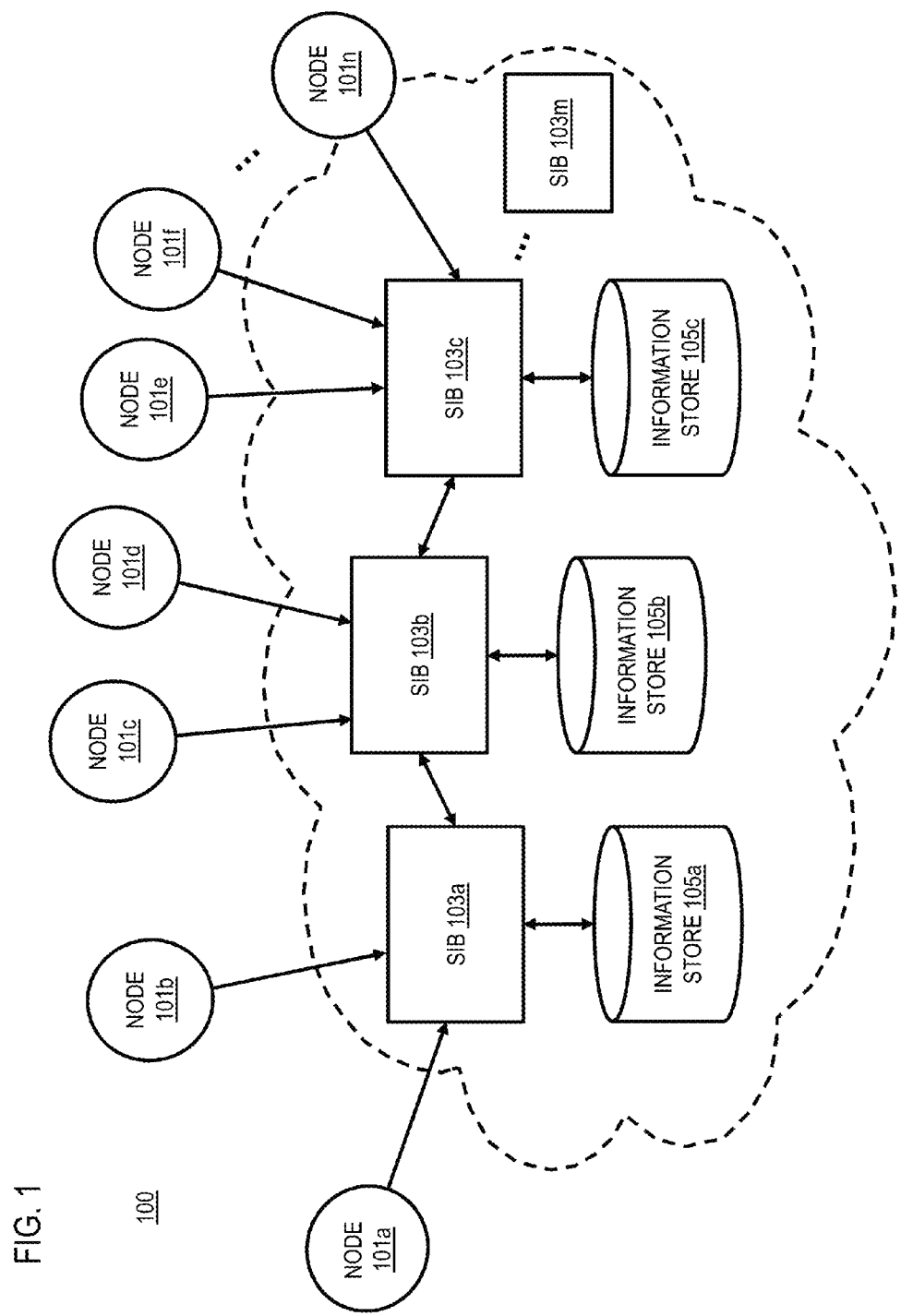
FIG. 1 is a diagram of a smart space logical architecture, according to one embodiment.

FIG. 1 is a diagram of a smart space logical architecture, according to one embodiment. In this example, each individual smart space 100 is considered as an aggregated information space with information from different sources. For example, a user's personal smart space contains information such as the user's personal information, family information, work information, social network information, etc. which came from all sources. In addition, such information may be serialized via different formats to, for instance, reduce resource requirements for storing the information.

The term "semantic web" refers to a universal medium for data, information, and knowledge exchange. This information exchange inserts documents with computer-comprehensible meaning (semantics) and makes them available on the semantic web. The semantic web is a "web of data" instead of the "web of documents". Knowledge in the semantic web is structured and organized at a finer level of granularity than free-text document, and the vocabulary includes not only literal words but also universal identifiers.

As used herein, the term "media" refers to information and data or anything else capable of being defined in the semantic web and presented to an end-user/audience in specific contexts in order provide value and/or experience. Content may be delivered via any medium such as the internet, consumer electronics, CDs, and live events such as conferences and stage performances. Digital content may take the form of an electronic document, image, audio file, video file, multimedia file, service (e.g., "today's financial news on the Stock Exchange"), etc. Not all digital content is network retrievable.

The term "smart space" refers to a plurality of information spaces of different entities in a "smart space architecture" that allows the entities and different semantic web tools to access heterogeneous information embedded in different semantic domains available for different semantic web tools as described herein. The semantic web is designed to share information based upon common representation formats, ontologies and semantics, such that information would become globally ubiquitous and interoperable. However much of the information is not desired to ubiquitous, but remain hidden, private and is interpreted locally, such as personal information. To address to this issue, a smart space architecture (an entity focused structure) is developed such that a user can encapsulate all of personal information and interact with the information in the smart space according to the user's individual semantics and needs. The user can be a person, an organization, or other entity (e.g., legal entities, business entities, non-profit organizations, etc.). In the smart space, a user can use one or more nodes (e.g., mobile telephones, computers, consumer electronics, and similar terminals) to perform tasks without knowing anything about the nodes, and the nodes interoperate by communicating implicitly through smart spaces of different users without knowing each other. Such anonymity simplifies control, communication and coordination in the smart space, thereby reducing hardware and software operation time and costs. Cloud computing may be used with or in place of the smart space. By using just cloud computing, the user delegates control over the personal data to service providers, which could cause privacy issues.

A recent trend is providing connectivity among many types of consumer electronics. Many consumers electronics not traditionally associated with computer use (such as televisions or other audio or video equipment) are provided with options to connect to the web or to a computer in a home network providing access to digital content. By way of example, Internet connectivity is included in many devices using technologies such as Wi-Fi, Bluetooth, Ethernet, etc. When a conventional media content delivery system involves multiple devices, the system typically requires a management server (such as a personal computer, or a custom-made unit or appliance) to coordinate content delivery via the different devices. Even with such a management server, the user typically would have to manually select the device which can provide or deliver desired content. By way of example, in a typical content delivery environment of a home theater system, a user manually controls a central receiver to choose which device connected to the receiver (e.g., a set-top box, DVR or Blu-ray disc player) will be supplying content for display.

In another example, when obtaining online media content from a service provider, the operation often involves a conventional content delivery network or content distribution network (CDN) that includes computers or servers containing copies of data of text, audio, still images, animation, video, and interactivity content forms placed at various points so as to maximize bandwidth for access to the data from clients throughout the network. In one example, a client server accesses a copy of the data at a provider server near to the client server, as opposed to all clients accessing the same central server, so as to avoid bottleneck near that server. The conventional media presentation mechanisms assume separate use of data by each application. This approach is not always suitable for such areas as media services. There are a number of multimedia video services online. At best, they offer user devices with multimedia video services that either have standard format, quality, etc. regardless the presenting capabilities of the user devices, or have format, quality, etc. adjusted for the presenting capabilities of a requesting user device. There is no true solution that considers all user devices (e.g., personal electronics, etc.) available for the user at a special context (such as in a conference room, or at home), while delivering the best possible media presentation quality via the available devices. In other words, the conventional content delivery concept generally considers one user device (e.g., the content requesting device or a client server) and, therefore, other devices accessible to the user with potentially more capabilities or capabilities more suited to deliver the content can go unused.

To address these problems, the smart space 100 provides seamless connectivity among devices so as to detect their availability for the user as well as their capabilities to handle different a format, quality, etc. of requested media content. In one embodiment, the smart space 100 also coordinates the available and capable devices to pre-process and to present the requested media content. In particular, a media provision coordinating application (also known as a media manager) operating over a media management framework is designed to coordinate media service provision in the smart space 100, thereby building the media management framework on top of the smart space 100 to deploy different devices to present different media content (e.g., multimedia movies, advance virtual telescopes, augmented virtuality games, virtual reality training/therapies, etc.). The media manger coordinates the tasks of pre-processing and the tasks of presenting among the available and capable devices based, at least in part, upon the format, quality, etc. of the media content as well as the user's physical accessibility to the devices and the capabilities of the accessible devices.

In one sample use case, the user is participating in a multimedia business conference to demonstrate a new three dimensional (3D) astronomical multiplayer game utilizing streaming 3D video, audio, and a whole new set of real time animation and user interactivity. In this example, the media manger retrieves astronomical media content from a public server (e.g., publicly available content maintained by the U.S. National Aeronautics and Space Administration (NASA)) to generate gaming data for the 3D astronomical multiplayer game. The media manger detects all devices that are, for instance, available to a user A such as a high definition television (HDTV) or projection system located in a conference room the user A is currently in, as well as a computer in the user's office. In one embodiment, the media manger coordinates the computer to pre-process the gaming data into visual and audio signals compatible with the HDTV (e.g., by converting the content from the public server into standard television broadcast format), and directs the HDTV to present the pre-processed signals. It is noted that other users at other locations may have different available and capable devices for the media manger to coordinate the presentation of the gaming data.

In one embodiment, the media management framework performs automatically and does not require human intervention to support the live game demonstration online for all attendees of the conference even if the attendees are participating in the demonstration at different remote locations. For example, for each attendee, the media manager detects available presentation devices at the respective remote location and devices that can process the signal the remote presentation devices.

In one embodiment, the media management framework extends the basic architecture of the smart space 100 with special modules to deliver media content (e.g., images, video, audio, etc.) via different devices serving the user. The user does not need to own these presentation or processing devices, but only to obtain usage rights of these devices via renting, leasing, borrowing, etc.

In addition, the media management framework manages user devices with significantly different capabilities and restrictions, to provide the user with a maximum or predetermined quality of media content (e.g., quality with respect to resolution, format, compression, etc.). This is especially important for multimedia services. For example, it is noted that delivery and processing of multimedia content generally require more technical know-how, power, bandwidth, etc. The media management framework maximizes efficiency of using the smart-space-compliant devices to improve user experience. The media management framework also provides mechanisms and means for efficient and effective distribution of the related work load thus minimizing network resources (e.g., by retrieving content from the most efficient provider). In one embodiment, the media management framework uses available pre-processing devices to conduct pre-processing in parallel, and then send the pre-processed data to the presenting devices. In another embodiment, the media management framework deploys cloud computing (e.g., via back-end servers) to handle the pre-processing.

The media management framework in the smart space 100 is content-centered. In the example of the multimedia business conference for demonstrating live a new 3D astronomical game, the conference is not driven by an agenda or predefined process. Instead, the conference emerges in a dynamic and opportunistic manner in reaction to the available and capable devices for presenting the media content. In one embodiment, if a digital projector suddenly breaks down, the media management framework switches the presentation to another display (e.g., an HDTV) at or near the same location and pre-process the media content to be compatible with the other display on the fly. An important aspect in the content-centered approach is the flexible and easy interleaving of conferencing with media presentations. The conferencing itself is flexible and can lead into vivid and dynamic interaction between attendees. Optionally, the media management frame framework personalizes the media content for the user, by monitoring the user preferences and deductively analyzing user context and preferences.

In yet another embodiment, the media management framework provides a great flexibility in design and easy-to-use tools for personalizing the user account and access media content as much as user desires. In other words, the media management framework provides a new paradigm of designing media services that proactively fulfills user needs, reuses data collected by other services, and integrates multi-modular applications into an interconnected service provision platform that can be used to control and/or coordinate mobile devices, PCs, consumer electronics (digital projectors, HDTVs, telephones, MP3 players, audio equipment, calculators, GPS automotive navigation systems, digital cameras, playback and recording of video media such as DVDs, VHSs or camcorders, gaming devices, karaoke machines), etc.

As seen in FIG. 1, each smart space is distributed across at least one set of nodes (e.g., devices) belonging to at least one user. In this embodiment, the smart space 100 is distributed across multiple nodes 101a-101n that each belong to multiple users. For example, nodes 101a and 101b belong to a first user, while nodes 101c-101f belong to a second user. It is also contemplated that one or more of the nodes (e.g., node 101n) may belong to a centralized information provider. Nodes 101 are personal/individual in that they perform tasks either directly decided by the user or autonomously for or on behalf of the user. For example, the nodes 101 can monitor predetermined situations or reason/data-mine information available in the smart space 100.

A node 101 may connect to one or more smart spaces 100 at a time. Moreover, the specific smart spaces 100 and to which the node 101 is connected may vary over the lifetime of a node. Mobility of nodes 101 is provided by moving links to the smart space 100 rather than moving a physical running process of the smart space 100. The node 101 can save its state and become 'mobile' when another node 101 restores that state. Nodes 101 themselves are anonymous and independent of each other—there is no explicit control flow between the nodes 101 other than that provided through preconditions to node actions. A coordination model based around expressing coordination structures as first-order entities and focusing on collecting reasoning and context. Control flow can be made outside of the smart space 100 through nodes 101 and the applications serving the nodes 101 explicitly sharing details of their external interfaces through the smart space 100. The responsibilities of nodes 101 range from user-interaction to reasoning and performing tasks such as truth maintenance, belief revision, information consistency management etc.

The nodes 101 access information in the smart space 100 through semantic information brokers (SIB) (e.g., SIBs 103a-103n) by connecting to any of the SIBs 103 making up the smart space 100 by whatever connectivity mechanisms (e.g., connectivity over a data network, the Internet, etc.) the SIBs 103 offer. Usually, the connection is over some network (e.g., data network, wireless network, telephony network, service provider network, etc.), and the nodes 101 are running on various devices. For example, the node 101 may be supported on any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the device supporting the node 101 can support any type of interface to the user (such as "wearable" circuitry, etc.).

Additionally, a communication network (not shown) capable of supporting the smart space 100 can include one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

Each SIB 103 is an entity performing information transaction operations, possibly co-operating with other SIBs 103, for the smart space 100. In one embodiment, an SIB 103 may be a concrete or virtual entity. Each SIB 103 supports nodes 101 interacting with other SIBs 103 through information transaction operations. In this embodiment, the smart space 100 includes SIBs 103a-103m each connected to respective information stores 105a-105c. Each information store 105 of the smart space 100 stores the information of the nodes 101, and any other information available over the smart space 100. This can include, for example, information of a current state or activity of the node 101, observations of the outside information world, maintenance information, and the like. Synchronization between these distributed, individual information stores 105 is asymmetric according to device and network capabilities as well as the user's needs in terms of security, privacy, etc. For example, private information about a user's family is stored at the user's home location where stricter information security policies can protect the information. The private information can then be augmented by non-private information at a website (e.g., a social networking website) without actually transferring the private information to the website. In this case, augmenting information is preferable to merging information due to, for instance, copyright and/or privacy concerns.

A smart space 100 and the media management framework built on top of the smart space 100 transcends over many of the user's devices (e.g., mobile phones, media centers, personal computers, servers, routers, etc.) enabling the distribution of information and queries upon that information over any of the user's devices. For any node 101 accessing the information, the physical location of the node 101 and the location of the information are irrelevant, i.e., a node 101 sees the 'totality' of all information in that smart space 100. By way of example, the nodes 101 access the smart space 100 with basic operations including Insert (to insert information into a smart space), Remove (to remove information from a smart space), Update (to update information in a smart space, which is effectively an atomic remove and insert combination), Query (to query for information in a smart space), Subscribe (to set up a persistent query in a smart space such that a change in the query results is communicated to the subscribing node), etc. The nodes 101 communicate implicitly by inserting information to the smart space 100 and querying the information in the space 100.

Interaction among smart spaces 100 is nominally conducted by the nodes 101 which encapsulate fine grained functionality to be distributed across any number of devices that have access to one or more of the smart spaces 100. The smart spaces 100 themselves can interact through merging and projection thereby enabling larger smart spaces 100 to be constructed either on a permanent or temporary basis. Moreover, the smart space 100 may be a personal space, a share/social space of at least two users, a group space, a public space of a community, a county, a state, or a county, etc., and the like. The aggregation of all smart spaces 100 constitutes the world of information (including the semantic web) which is also referred to as a smart space. A smart space 100 including the entire world of information also supports all services (including all platforms and vendors) available in the world, as well as all of the world's devices and equipment.

Figure 2:
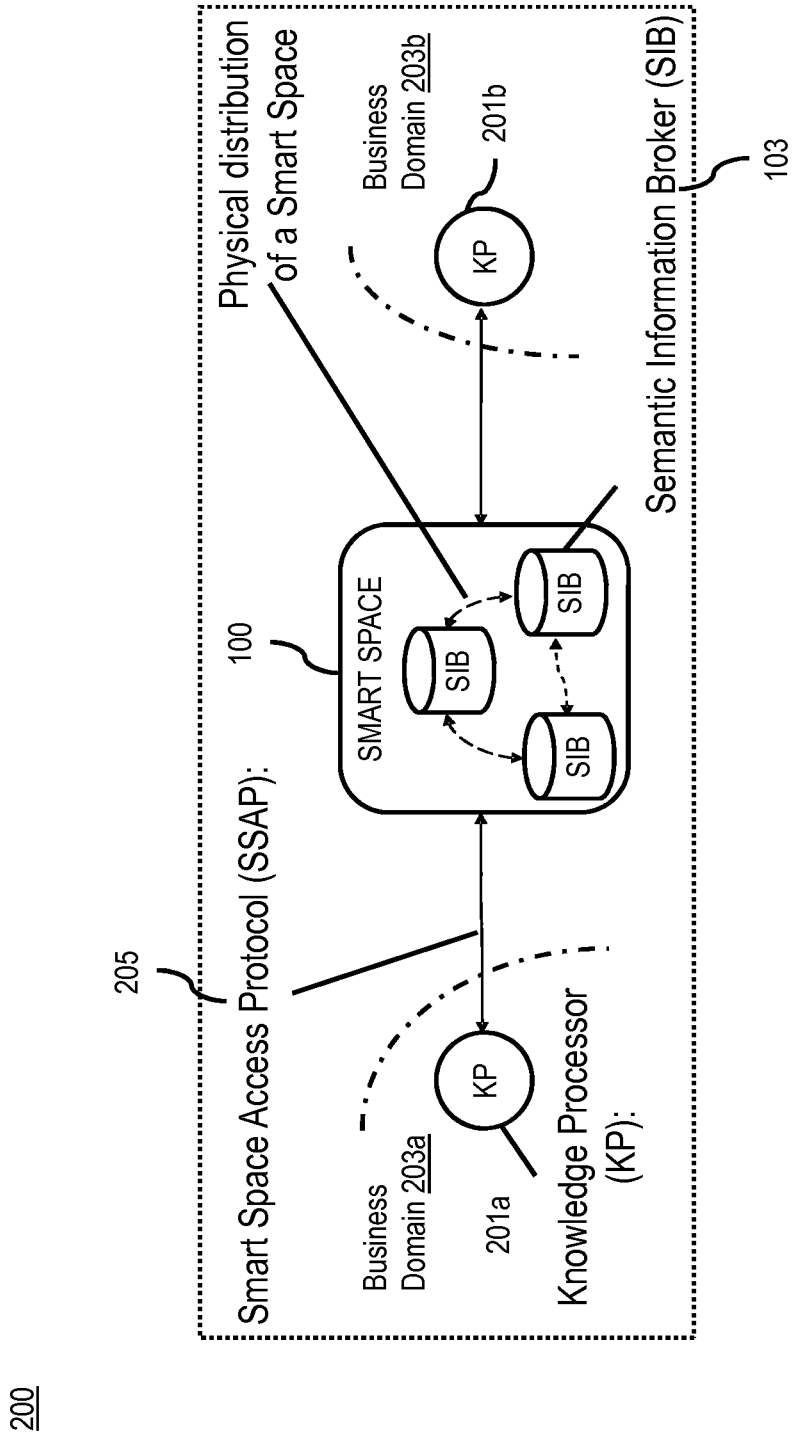
FIG. 2 is a diagram of the smart space logical architecture including knowledge processors, according to one embodiment.

The rules of information usage (e.g., as provided in applications) for the smart space 100 are implemented in knowledge processors (KP) (e.g., KP 201a and 201b) connected to the smart space 100 via SIBs 103. The responsibilities of KPs range from user-interaction to reasoning and performing tasks such as truth maintenance, belief revision, information consistency management, etc. FIG. 2 is a diagram 200 of the smart space logical architecture including knowledge processors, according to one embodiment. In one embodiment, the SIBs 103 are responsible for storing and sharing smart space information.

For example, as soon as an information unit becomes available for the SIB 103, the information unit also becomes available for every KP 201 served by the SIB 103. The KPs 201, for instance, are responsible for processing information obtained from the SIBs 103. A KP 201a uses one or more partner KPs 201b for sharing of content. This partnership arrangement implies that there is an agreed set of semantics among the KPs 201a-201b for the used ontology. KPs 201a and 201b may run in different business domains (e.g., business domain 203a and 203b respectively) to allow the public or public entities to access the same information service regardless of which business domain 203 the public or public entities are located. In the smart space 100, a smart space access protocol (SSAP) 205 is used between the SIBs 103 and KPs 201, among SIBs 103, and among KPs 201 to, e.g., join, leave, insert, remove, update, query, subscribe, and/or unsubscribe information.

The smart space 100 and the media management framework are interoperable over different information domains, different service platforms, and different devices and equipment. For example, the smart space 100 accommodates transmission control protocol/Internet protocol (TCP/IP), Unified Protocol (UniPro) created by the Mobile Industry Processor Interface (MIPI) Alliance, Bluetooth protocol Radio Frequency Communication (RFCOMM), IPv6 over Low power Wireless Personal Area Networks (6LoWPAN), etc. The smart space 100 also covers technologies used for discovering and using services, such as Bluetooth/human interface device (HID) services, web services, services certified by the Digital Living Network Alliance (DLNA), the Network on Terminal Architecture (NoTA), etc. The smart space 100 constitutes an infrastructure that enables scalable producer-consumer transactions for information, and supports multiparts, multidevices and multivendors (M3), via a common representation of a set of concepts within a domain (such as a RDF domain) and the relationships between those concepts, i.e. ontologies. The smart space 100 as a logical architecture has no dependencies on any network architecture but it is implemented on top of practically any connectivity solution. Since there is no specific service level architecture in the smart space 100, the smart space 100 has no limitation in physical distance or transport. The smart space 100 architecture allows user devices purchased at different times and from different vendors to work together. For example, via the media management framework, the user can listen/watch/etc. to music/movies/etc. wherever the user is using one or more personal devices in the vicinity of high quality speakers or display. In addition, the smart space 100 architecture allows application developers to mash-up services in different domains, instead of trying to port an application to all platforms and configurations. The smart space architecture also allows device manufacturers to make interoperable products, so that consumers have no concern about compatibility of different products and accessories.

By way of example, RDF/XML may be used in the smart space 100 to store media content in information stores 105a-105c. RDF/XML is a syntax that serializes an Resource Description Framework (RDF) graph as an Extensible Markup Language (XML) document. RDF allows joining data in vocabularies from different business domains 203a and 203b without having to negotiate structural differences between the vocabularies. Via the RDF/XML, the smart space 100 merges the information of the embedded domains with the information on the semantic web, as well as makes the vast reasoning and ontology theories, practices and tools developed by the semantic web community available for application development in the smart space 100. The smart space 100 also makes the heterogeneous information in embedded domains available to the semantic web tools. It is contemplated that the approach described herein may be used with other semantic web tools, such as a variety of data interchange formats (e.g. N3, Turtle, N-Triples), and notations such as RDF Schema (RDFS) and the Web Ontology Language (OWL), which are intended to provide a formal description of concepts, terms, and relationships within a given knowledge domain. Instead of the smart space access protocol, the smart space 100 may use Simple Object Access Protocol (SOAP) for exchanging structured information and media content.

Various embodiments are described herein with respect to coordinating access to media content as well as presenting the media content in the semantic web and the smart space. Although multimedia is frequently used as an example, it is contemplated that the approach described herein may be used with other media content.

Figure 3:
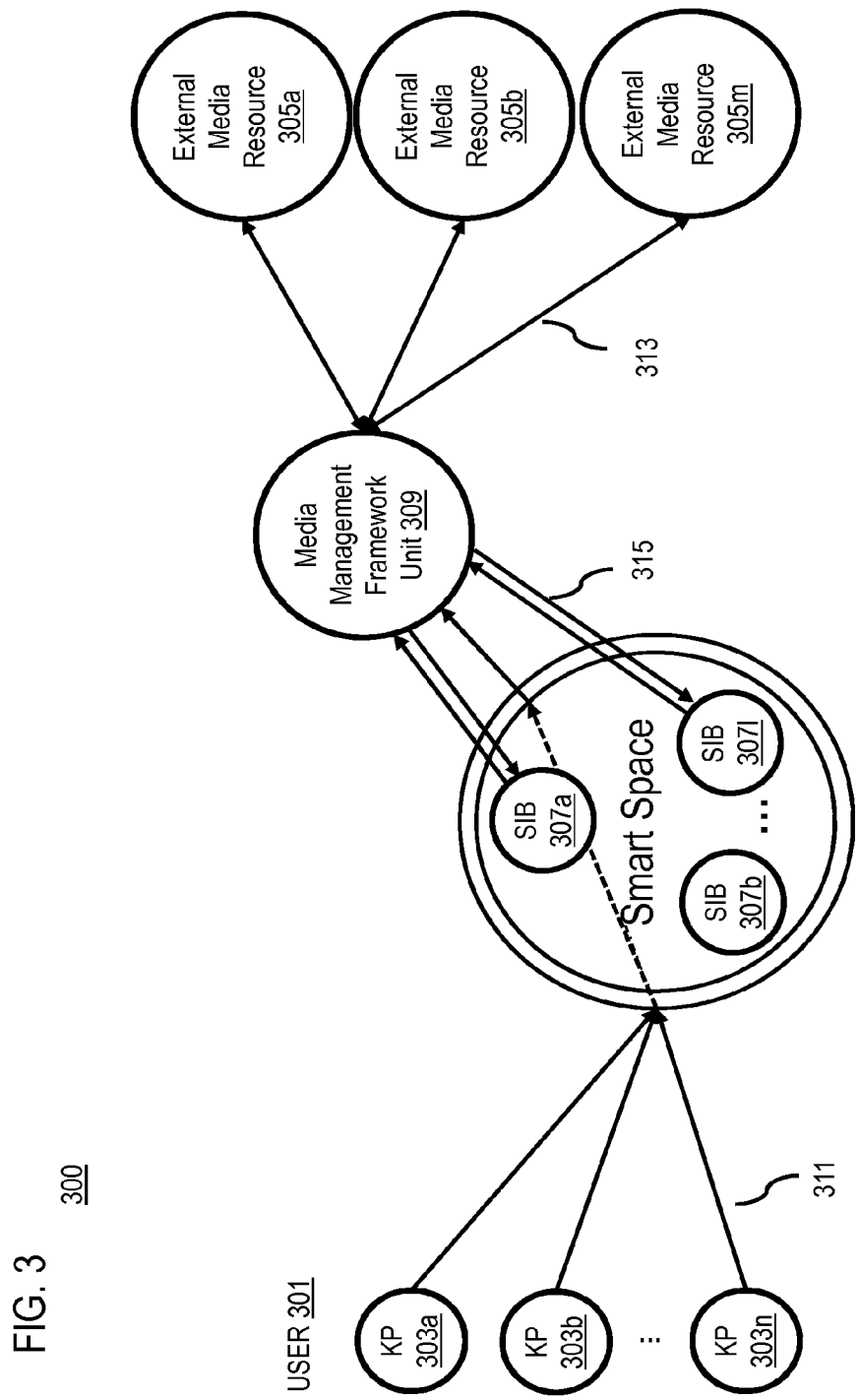
FIG. 3 is a diagram of the smart space architecture including a media management framework, according to one embodiment.

FIG. 3 is a diagram 300 of the smart space architecture including a media management framework, according to one embodiment. In the example of FIG. 3, the smart space 100 currently serves a user 301. The user 301 interacts with the smart space 100 via the user's knowledge processors, e.g., KP 303a, KP 303b, ... KP303n. by way of example, each of the user's knowledge processors may correspond to a user device.

In one embodiment, the KP 303n of the user 301 directly requests media content from one or more external media resources, e.g., 305a, 305b, ... 305m (without going through semantic information brokers SIB 307a, SIB 307b, ... SIB 307l). As shown by a path 311, the request bypasses the SIB 307a and reaches the media management framework. Logically, this media management framework can be presented by a single media management framework unit 309 as illustrated by FIG. 3. The media management framework unit 309 provides an interface for tasks distribution and resource management for all services (KPs) that process media content. The media management framework unit 309 then contacts an external media resources 305m for the requested media content via a path 313. The requested media content is then passed to the media management framework unit 309 for processing, and then sent to one of more of the KPs for optimal presentation (not necessarily involving the KP 303n).

In another embodiment, the KP 303n requests the media content through one of the semantic information broker, e.g., SIB 307l. The SIB 307l then passes the request to the media management framework unit 309 via a path 315. The media management framework unit 309 then contacts the external media resources 305m for the requested media content via the path 313, and then receives, processes and transmits the media content as discussed above.

Figure 4:
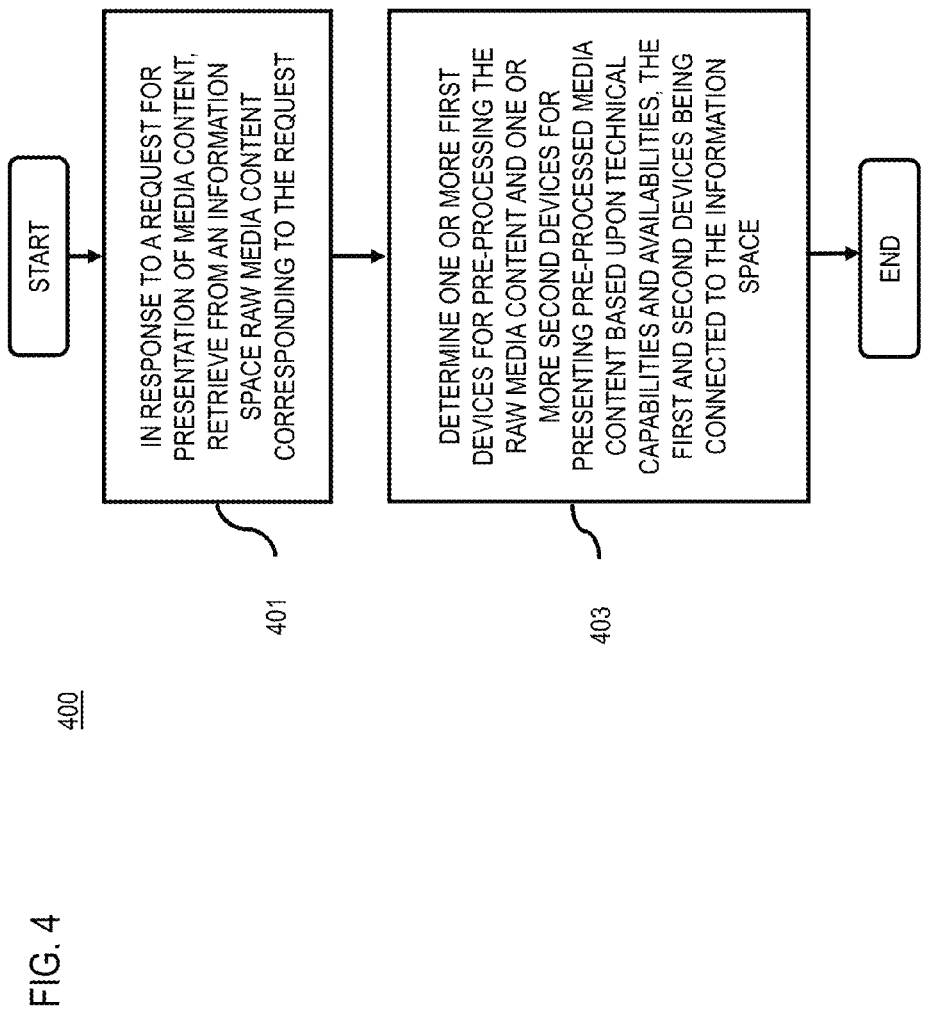
FIG. 4 is a flowchart of a process for coordinating media content presentation in a smart space, according to one embodiment.
Figure 12:
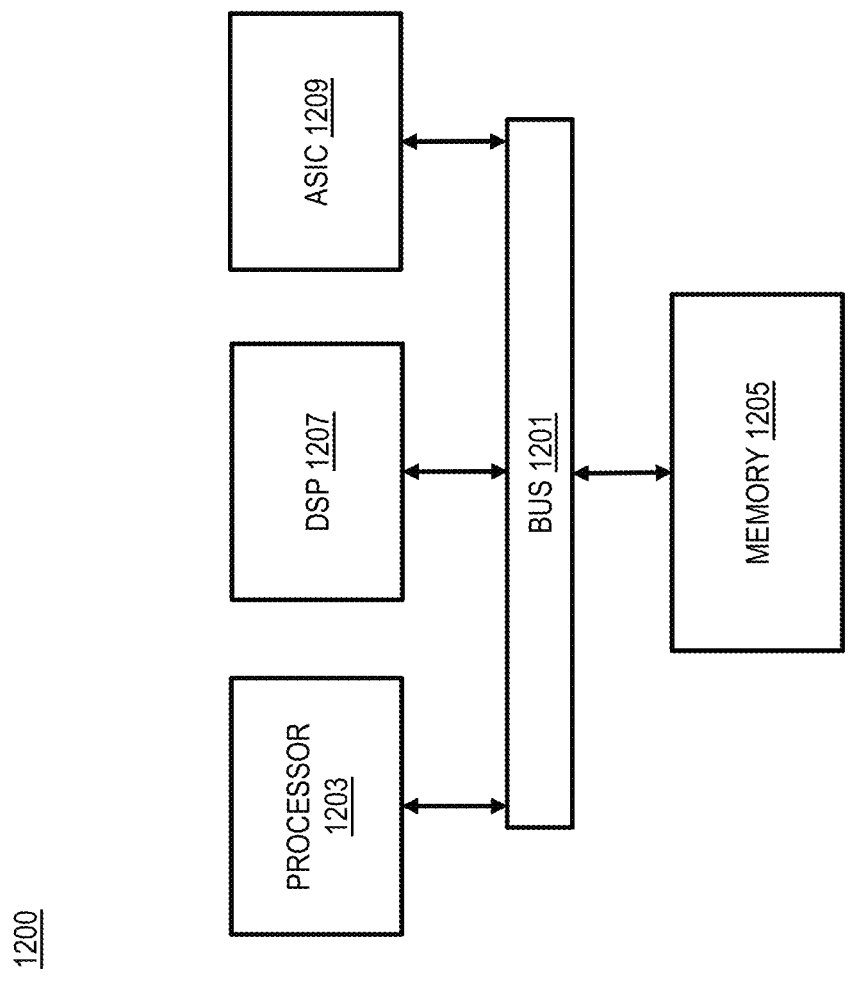
FIG. 12 is a diagram of a chip set that can be used to implement an embodiment of the invention.

FIG. 4 is a flowchart of a process 400 for coordinating media content presentation in a smart space, according to one embodiment. As mentioned, the media management framework is designed to coordinate media content presentation in the smart space 100. In one embodiment, the media management framework (e.g., an application) performs the process 400 and is implemented in, for instance, a chip set including a processor and a memory as shown in FIG. 12. In step 401, the media management framework, in response to a request for presentation of media content, retrieves from the smart space 100 raw media content (e.g., NASA Mars mission data stream) corresponding to the request. The media management framework determines one or more first devices (e.g., a synthesizer) for pre-processing the raw media content and one or more second devices (e.g., a digital projector) for presenting pre-processed media content based upon technical capabilities and availabilities, thereby optimizing the presentation of the media content (Step 403). In one embodiment, the raw media content can be pre-processed into a format, quality, etc. that is compatible with available presenting device(s). In some cases, the raw data may be directly rendered at the presenting device(s) without pre-processing such as when the presenting device(s) is compatible with the raw data format. The first and second devices are connected to the smart space 100 so as to be controlled and/or coordinated via the media management framework. The objective may be to create the optimal presentation possible by minimizing execution duration and maximizing the use of the available resources.

Therefore, the media management framework handles the media content presentation request on the fly, without being tied to any predefined application hierarchy, user hierarchy, or resource hierarchy. The intrinsic characteristics of the media content requests involve characteristics of the application, users, and/or resources which are essentially unlimited in numbers, difficult to pre-define, and complicated by nature. As results, the optimization based on factors of application/user/resource are cumbersome for administrators to implement, thus is better implemented by the media management framework.

Figure 5:
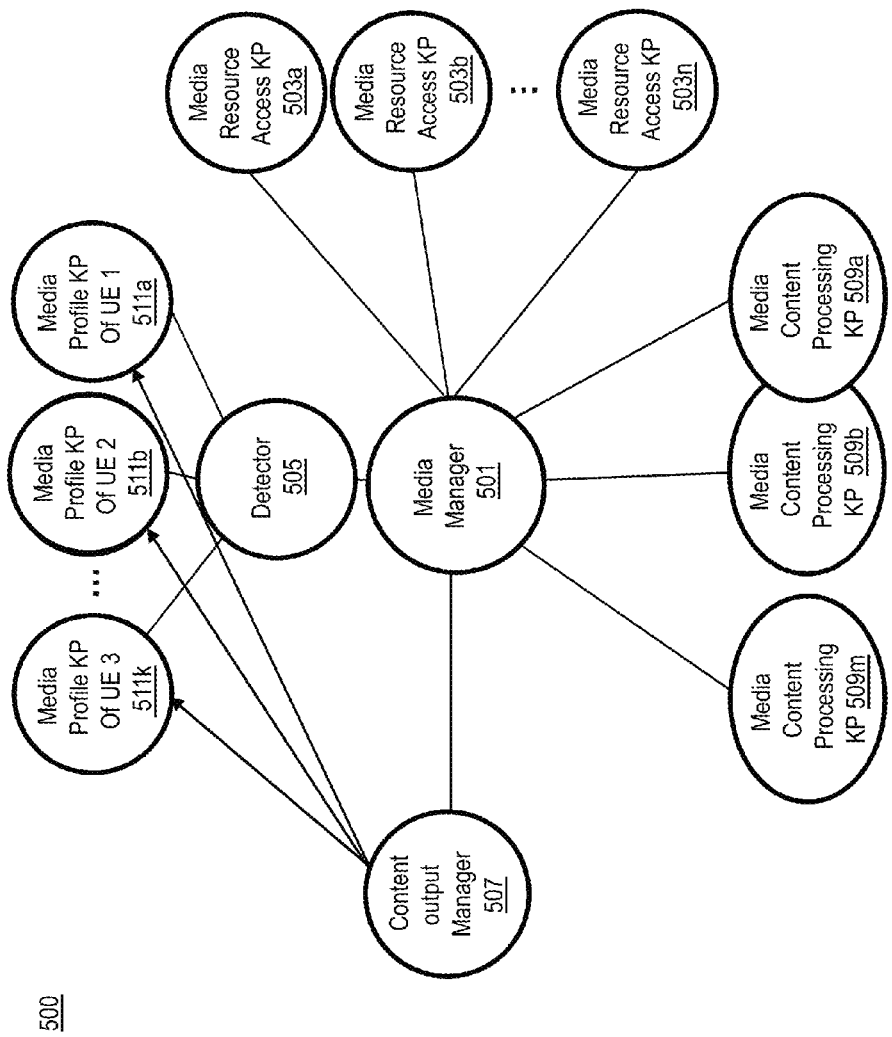
FIG. 5 is a diagram of a media management framework, according to one embodiment.

FIG. 5 is a diagram of a media management framework 500, according to one embodiment. The multimedia management framework 500 has a complex distributed structure and includes a number of internal units that may be located on different physical devices in the smart space 100. Each internal unit can be implemented as special logic function inside the SIBs reasoning environment or as a supporting knowledge processor (KP). A media manager 501 is provided in the center of the media management framework 500. The media manager 501 manages all key functions of the framework 500, e.g., selecting one or more content resources (e.g., NASA, Russian Federal Space Agency, observatories for live astronomical images and metadata etc,) for user requested media content (e.g., a 3D astronomical multiplayer game), preparing and sending corresponding media content requests to one or more media resource access knowledge processors KP 503a, KP 503b, ... KP 503n each corresponding to one of the content resources, receiving media content collected by the media resource access KPs 503, and requesting a detector 505 to perform functions of detecting and selection.

The media management framework 500 includes one designated media resource access KP 503 as an interface for each external media content resource. The media resource access KPs 503 are created by content providers and/or application developers, and then reuse them when needed. The internal complexity of media resource access KPs vary depending on the format, organization, access restrictions and other factors concerning the relevant media resource. The media resource access KP 503 finds proper media content on the selected media resources and delivers the content to the smart space according to (or best possible approximation) a target quality level, coding, data format, etc.

The detector 505 detects which of user devices UE 1, UE 2, UE 3 are capable and available for presenting the media content. The detector 505 also detects which of media content processing devices (e.g., any processing power, storage, software or other computing services access to the user locally or via internet/cloud) are available for preprocessing the media content collected from the resources. The media content processing devices can be any processing power, storage, software or other computing services access to the user locally or via internet/cloud/smart space. In particular, the detector 505 contacts media content processing KPs 509a, 509b, ... 509m corresponding to the media content processing devices to find out whether the respective device is available for pre-processing the media content. In addition, the detector 505 contacts a media profile KP 511a of the UE 1, a media profile KP 511b of the UE 2, ... and a media profile KP 511k of the UE 3 to find out whether the respective user device is available for presenting the media content.

The detector 505 is a special KP for registering and monitoring states of the user devices 511 with media presenting capabilities. When the media manager 501 receives a user request for serving new media content, in parallel to sending content requests to the media resource access KPs 503, the media manager 501 also sends a request to the detector 505 for available user devices 511. The request to the detector 505 defines what user devices can be used for delivering/presenting media content to the user.

After receiving the device information from the detector 505, the media manager 501 selects the best set of devices for preprocessing, requests the selected pro-processing devices to process the collected media content, combines the resulted quality-optimized media content, and forwards the combined output to a media output manager 507. The media output manager 507 then outputs the pre-processed media content to presenting devices selected by the media manager 501 (e.g., digital projectors, HDTVs, audio equipment, playback and recording of video media, gaming devices, etc.) for presentation. The device selection is made based upon user context and/or the device context (e.g., time. location, activities, etc.).

In one embodiment, the device selection is made based upon the location of the user, which usually limits the presenting devices that are accessible to the user. By way of example, when the media manager 501 determines or is informed that the user is at home, instead of using mobile devices for delivering a 3D multimedia game, the media manager 501 defines potential user devices as accessible at home, such as a game control console, a home digital TV, a home music center, etc. The media manager 501 may determine that the user is at home via data transmitted from a user device, a communication service platform, etc. In another embodiment, the media manager 501 is informed that the user is at home by a sensor built-in a user device, etc. With respect to the pre-processing devices, they can be located anywhere as long as they are connected to the smart space 100 and available for the user to use.

The device selection may be also limited by a time for presenting the media content, for example, if the availability of the user and/or the devices is defined by time. The device selection may be further limited by activities of the user for presenting the media content, for example, if the user is cooking the kitchen while writing a paper on a desk computer, and wants to watch and/or hear a cooking show in the kitchen as well as in the living room.

Based upon the media content presentation request defined by the media manager 501, the detector 505 checks availability of all multimedia-capable user devices in a given space/location (e.g., home) and produces an optimized decision regarding which devices should be used to deliver the 3D multimedia game. In another embodiment, the detector 505 only checks availability of all multimedia-capable user devices, and then passes the list to the media manager 501 for deciding which devices to deliver the 3D multimedia game.

Optimization may be based on a number of factors, such as media content presentation quality, user-friendliness, energy-efficiency, resource-constrain, device constrain, management overhead, cost, etc. The detector 505 or the media manager 501 performs multi-factorial optimization based on the factor values of all the available multimedia-capable devices UE1, UE2, UE 3 and the available media content pre-processing devices 509a, 509b, ... 509k. The multi-factorial optimization comprising assigning a hierarchal rank to each device, providing a set of synthetic factor values (quality, speed, cost, etc.) to each device, and conducting an auction amongst devices using their synthetic factor values.

Figure 6:
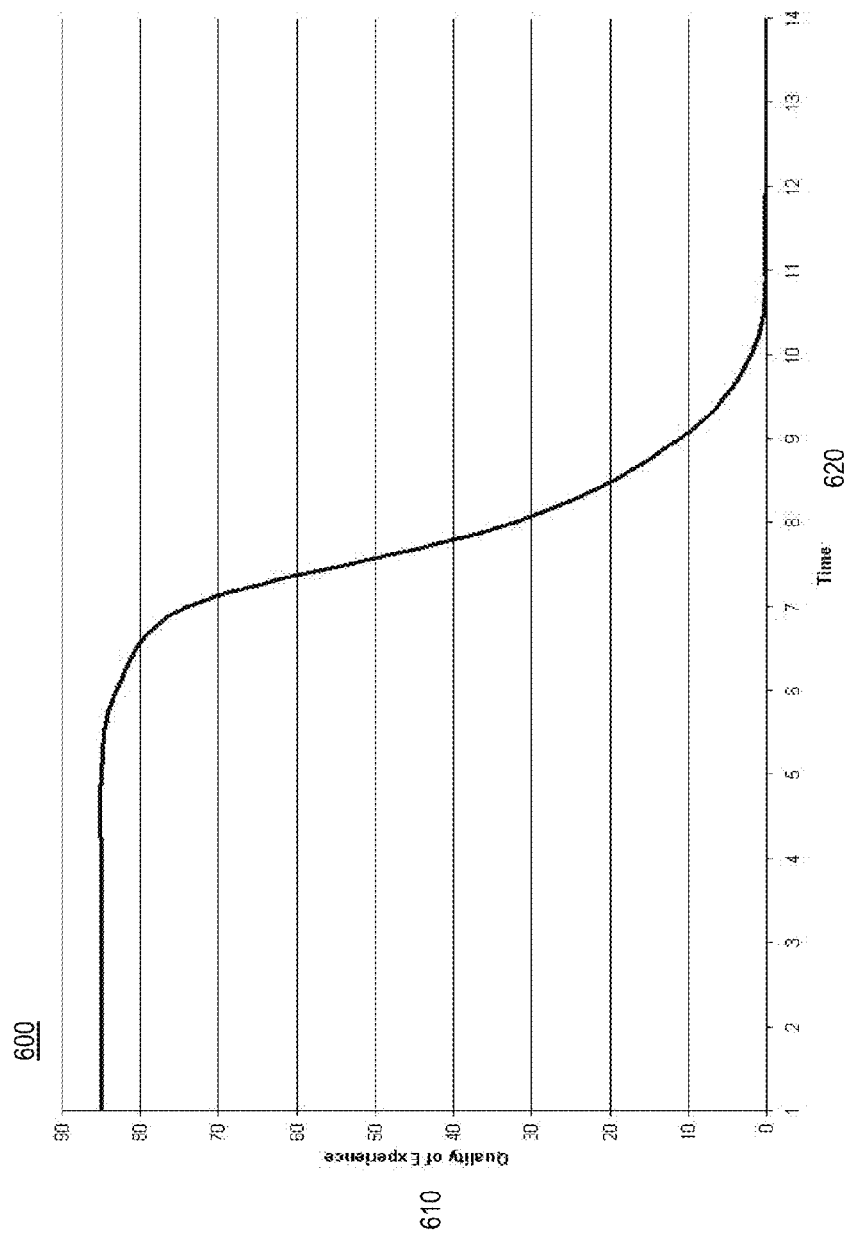
FIG. 6 is a diagram of a user experienced quality curve, according to one embodiment.

The media manager 501 may distribute service provision in time using a special type of delay flag set by a media resource access point. This flag indicates that a certain part of the media content is not essential (i.e., optional) to the media service, for example, as determined based upon a user experience model. In this embodiment, a decrease of user experience is modeled by a time dependent curve. FIG. 6 is a diagram of a user experienced quality curve 600, according to one embodiment. The curve 600 shows a quality of experience 610 (i.e., user experienced quality) changes along a time axis 620. By way of example, users have relatively low expectation for email reception timing, such that the users are not sensitive regarding the quality of their experience until the time has passed seven hours after they sent out emails. On the other hand, users have much higher expectation of responsiveness for chat rooms, media conferencing, etc. The manager 501 obtains additional freedom of operation by postponing non-essential features/functions with a delay flag to optimize key parameters of the media service.

As shown in FIG. 5, the framework 500 includes one special media profile KP 511 for each multimedia-capable user device UE in the smart space 100. The media profile KP 511 is responsible for low level implementation of an availability check protocol by considering the application programming interface (API) and other specifics of a given device. The KP 511 also stores information of actual media service capabilities of the corresponding device, and available methods for content handling and processing thereon. The device applicability for the media service is defined by values of optimization factors, which may be specified independently for each type of user experience. By way of example, video processing techniques are specific for different devices, such as digital TV, VCRs, DVDs, video codecs, video players, etc. Nevertheless, user experience of video output depends on the allowed resolution, frame-rate, bit-rate, audio output, etc. The audio output optimization may involve all sorts of sound effects such as echo, flanger, phaser, chorus, equalization, filtering, overdrive, pitch shift, time stretching, resonators, synthesizer, modulation, compression, 3D audio effects, reverse echo, etc.

The framework 500 further includes one special media content processing KP 509 for each device that can be used for media content pre-processing. The media content collected from different resources need to be pre-processed to adapt to a particular media service as well as to the available presenting devices. The media content processing KP 509 is responsible for preparing a package of tasks and collecting results from the corresponding device. The media content processing KP 509 monitors a current state and availability of the corresponding pre-processing device. Based on the current state, availability, and the above-defined optimization factors, the KP 507 calculates the device priority level at a given moment of time. A formula for calculating the device priority level is specific for each particular device type and defined by the KP designer. The formula may include coefficients that reflect communication abilities of the device, associated costs, etc. By way of example, a formula for the performance of a video quality metric is evaluated by computing the correlation between the objective quality scores and the subjective user test results (e.g., mean opinion scores).

The media output manager 507 is responsible for packaging the resulted media content flow and directs the flow to selected output devices 511 (e.g., a game control console, a home digital TV, a home music center, etc). The output manager 507 also keeps a list and a scheduler for processing the delayed features/functions of the media service. When proper conditions and time occur, the output manager 507 proactively launches the media service.

FIG. 7 is a flowchart of a process 700 of determining by a semantic information broker whether to process a request for media content from a knowledge processor, according to one embodiment. Referring back to FIG. 3, the KP 303n passes the media content request via the SIB 307l to the media management framework unit 309. The detailed operation of the SIB 307l is discussed as follows. In one embodiment, the SIB 307l performs the process 700 and is implemented in, for instance, a chip set including a processor and a memory as shown FIG. 12. In step 701, the KP 303n requests the SIB 307l for media content from the media content resources. The SIB 307l determines whether the pre-processing of the media content is necessary, for example, based upon the capabilities of the available and capable presenting device(s), thereby setting a special "media-supported" flag (Step 703). The media management framework unit 309 is used not only for accessing external media content resources, but also for adjusting media flows between any pair of resource-destination that are already in the smart space 100. If the determination is positive, the SIB 307l forwards the request to the media management framework unit 309 (Step 705). The media management framework unit 309 then processes the request as discussed in conjunction with FIG. 3, and then sends the pre-processed media content back to the SIB 307l. After receiving the pre-processed media content (e.g., multimedia stream) (Step 707), the SIB 307l transmits the pre-processed media content to selected presenting devices (Step 709) for presentation.

As shown in FIG. 7, when the SIB 307l determines that the requested media content will not benefit from the media management framework unit 309, it skips setting a special "media-supported" flag for the request (Step 703). It is up to a smart space designer to decide the conditions to involve the media management framework unit 309. Thereafter, the SIB 307l directly requests media content from a media content resource (Step 711), i.e., without involving the media management framework unit 309. By way of example, the SIB 307l determines that the raw data is sufficient for the user's usage and/or for the available presenting device. The user's usage may be for generating a bar chart in a PowerPoint slide. The available presenting device may be a mobile phone.

After receiving raw (i.e., not pre-processed) media content (Step 713), the SIB 307l transmits the raw media content to the KP 303n (Step 709) for presentation. The routes with and without involving the media management framework unit 309 can be taken in parallel to the pre-processing of media content requests.

FIG. 8A is a flowchart of a process 800 for coordinating media content presentation in a smart space, according to one embodiment. In one embodiment, the media management framework 500 performs the process 800 and is implemented in, for instance, a chip set including a processor and a memory as shown FIG. 12. Referring back to FIG. 5, in step 801, the media manager 501 of the media management framework 500 receives the media content request either directly from a KP or from a KP via a SIB. The media manager 501 selects one more media resource access KPs, including KPc, KPn (Step 803), sends media resource requests to the selected media resource access KPs (Step 815), and receives raw media content from the selected media resource access KPs (Step 817). Sequentially or concurrently, the media manager 501 requests the detector 505 to select one or more devices for pre-processing raw media content (Step 805), and then receives a list of one or more media content pre-processing devices (Step 807). The media manager 501 sends the collected raw media content to the list of pre-processing devices (Step 809), and then receives processed media content therefrom (Step 811). The media manager 501 then sends pre-processed media content to the output manager 507 (Step 813) for presenting at selected presenting devices.

Figure 8B:
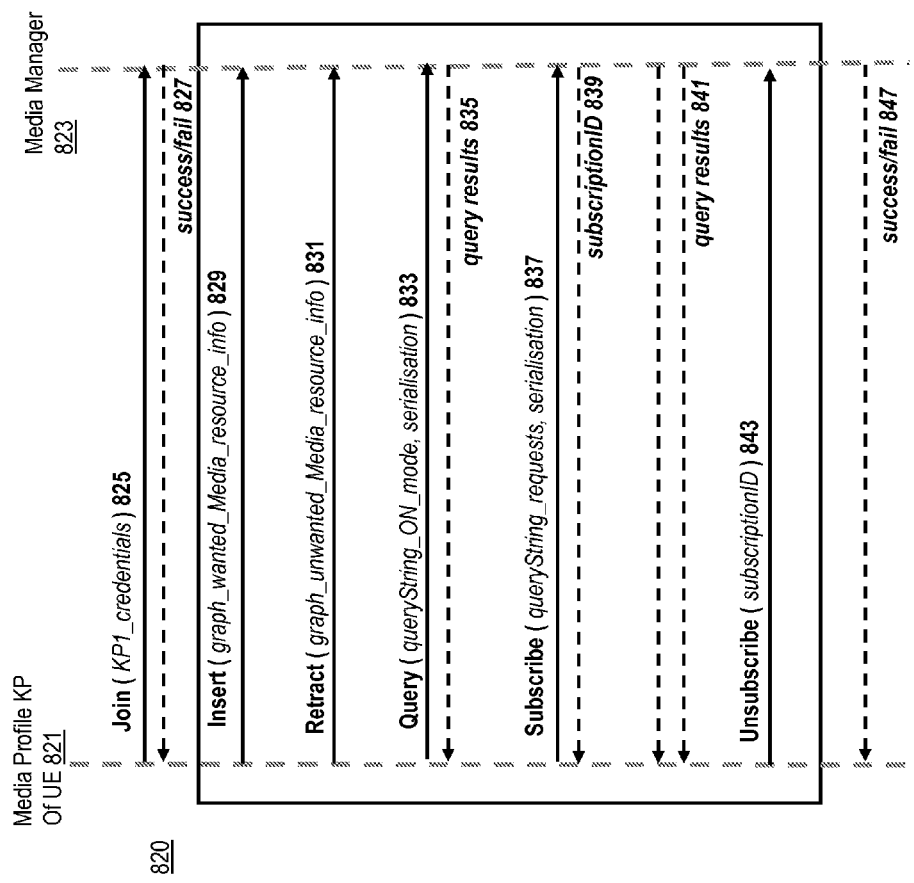
FIG. 8B is an operational diagram of a media profile knowledge processer interacting with a media manager in a media management framework, according to one embodiment.
Figure 9A:
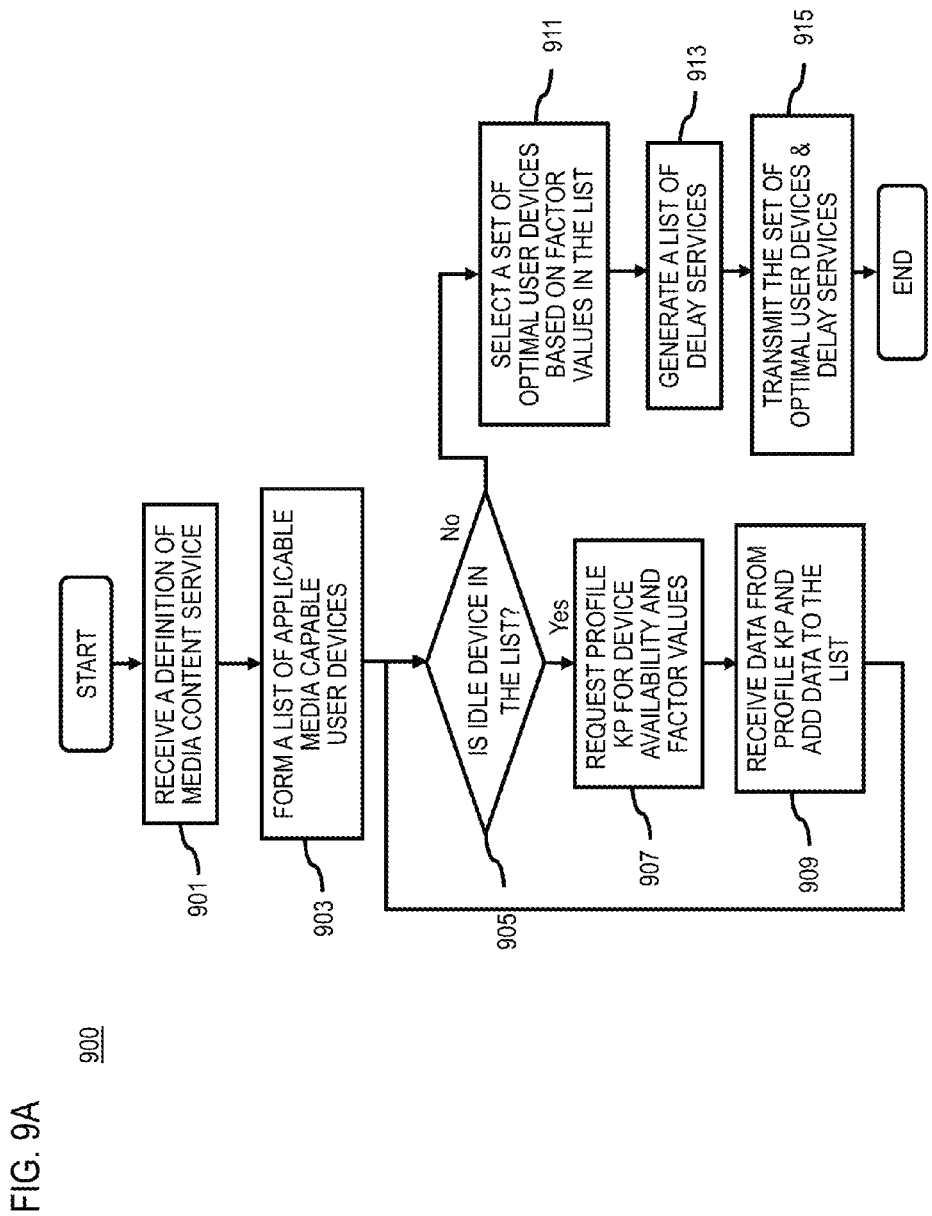
FIG. 9A is a flowchart of a process for detecting available presenting devices in a smart space, according to one embodiment.

Some steps for selecting media presenting devices are omitted from FIG. 8A to simplify FIG. 8A, and these steps are to be discussed in conjunction with FIG. 9A. These steps includes that the media manager 501 requests the detector 505 to select one or more devices for presenting media content, and then receives a list of one or more media content presenting device. These steps occur sequentially or concurrently with Steps 805-813.

FIG. 8B is an operational diagram 820 of a media profile knowledge processer interacting with a media manager in a media management framework, according to one embodiment. In one embodiment, the media profile knowledge processer 821 (corresponding a UE 1) joins in the media management framework by interacting with the media manager 823 (or an associated semantic information broker) to provide capabilities of the corresponding UE (i.e., a media presenting device) to the media manager 823. The interaction involves various smart space operational commands. The interaction starts with sending a Join command: Join (KP1_credentials) embedded with the credentials of the media profile KP from the KP 821 to the media manager 823 in an operation 825. The media manager 823 replies to the KP 821 with an indication of success or fail in an operation 827. The KP 821 inserts RDF graphs representing wanted media resources into the smart space with an Insert command: Insert (graph_wanted_Media_resource_info) in an operation 829. The KP 821 also retracts RDF graphs representing unwanted media resources into the smart space with a Retract command: Retract (graph_unwanted Media_resource_info) in an operation 831.

The KP 821 further queries RDF graphs representing requests for capabilities of the UE 1 into the smart space with a Query command: Query (queryString_ON_mode, serialisation) in an operation 833. In particular, the query is in a String ON mode which requires that all query results to be sting along (i.e., serialized) as a carousel. The media manager 823 replies to the KP 821 with the query results in the require mode in an operation 835.

The KP 821 further subscribes to the query results (i.e., a persistent query such that a change in the query results is communicated to the KP) with a Subscribe command: Subscribe (queryString_requests, serialisation) in an operation 837. The subscription is also in a String ON mode which requires that all query results to be sting along (i.e., serialized) as a carousel. The media manager 823 replies to the KP 821 with a subscription ID in an operation 839. Thereafter, the media manager 823 updates the KP 821 query results in the require mode in an operation 841, whenever there is a change to the query results.

When the KP decides to unsubscribe, it sends out an Unsubscribe command: Unsubscribe (subscriptionID) in an operation 843. The media manager 823 replies to the KP 821 with an indication of success or fail in an operation 847.

FIG. 9A is a flowchart of a process 900 for detecting available presenting devices in a smart space, according to one embodiment. In one embodiment, the detector 505 performs the process 900 and is implemented in, for instance, a chip set including a processor and a memory as shown FIG. 12. In step 901, the detector 505 receives from the media manager 501 a request to detect available media content pre-processing and presenting devices, and the request includes technical description/definition of the requested media content. By way of example, when the request is to display NASA's public, education and media channels, the definition is that the media content is available on an MPEG-2 digital C-band signal via satellite on AMC-3, Transponder 15C in continental North America, Alaska and Hawaii.

The detector 505 forms a list of applicable media user devices based upon the definition (Step 903). For example, the user needs a C-Band-sized satellite dish, and a Digital Video Broadcast (DVB)-compliant MPEG-2 Integrated Receiver Decoder, or IRD, to directly receive NASA's public channels. The detector 505 decides whether there is any idle device in the list that is available for deployment yet lack of technical specification information (Step 905). If so, the detector 505 requests technical specification data from a corresponding user device profile KP (Step 907), and then adds the technical specification data to the list (Step 909). The Steps 905-909 are repeated until the technical specification data of all idle devices in the list has been collected. The detector 505 then selects a set of optimal user devices for presenting the media content based upon the factor values in the list (Step 911). In addition, the detector 505 generates a list of one or more delay services which are not essential to the presentation of the requested media content (Step 913). The detector 505 then transmits information of the set of optimal user devices and the delay services to the media manager 501. Sequentially or concurrently with the Steps 903-915, the detector 505 prepares a list of the devices for pre-processing media content as discussed in conjunction with FIG. 8.

Referring back to the request of displaying NASA's media channels, according to the conventional media systems, if the user does not have a C-Band-sized satellite dish for receiving digital television signals, the user can only watch the channels online which quality is limited by the personal computer, PDA, etc. of the user. Even if the user has a C-Band-sized satellite dish, the user still needs a Digital Video Broadcast (DVB)-compliant MPEG-2 Integrated Receiver Decoder (IRD), to directly receive NASA's public channels. In addition, the user has to research on how to connect all these devices to work with the user's home theater so to view and interact with NASA's astronomical multimedia programs with the user's high resolution equipment. On the other hand, the media management framework 500 automatically handles media content with detecting, pro-processing, and presenting features as discussed, and does not require hardware adaptation and user intervention yet provides the best available solution to deliver media content to the user.

In addition, the user can access any devices connected to the smart space 100 as long as the user is authorized by a device owner. By way of example, the user's home theater can retrieve data of NASA's public channels from the user's neighbor's C-Band-sized satellite dish and IRD for display, as long as the user gets approval from the neighbor. Even if the user does not have a home theater, HDTV, or any high definition display, the user can have the media management framework 500 retrieve NASA's public channel data directly from a NASA server than display the media content (e.g., current events in astronomy like solar eclipse, and space exploration like unmanned mission to Mars, orbital test vehicles) with a big screen HDTV in the community room of the user's apartment building.

Figure 9B:
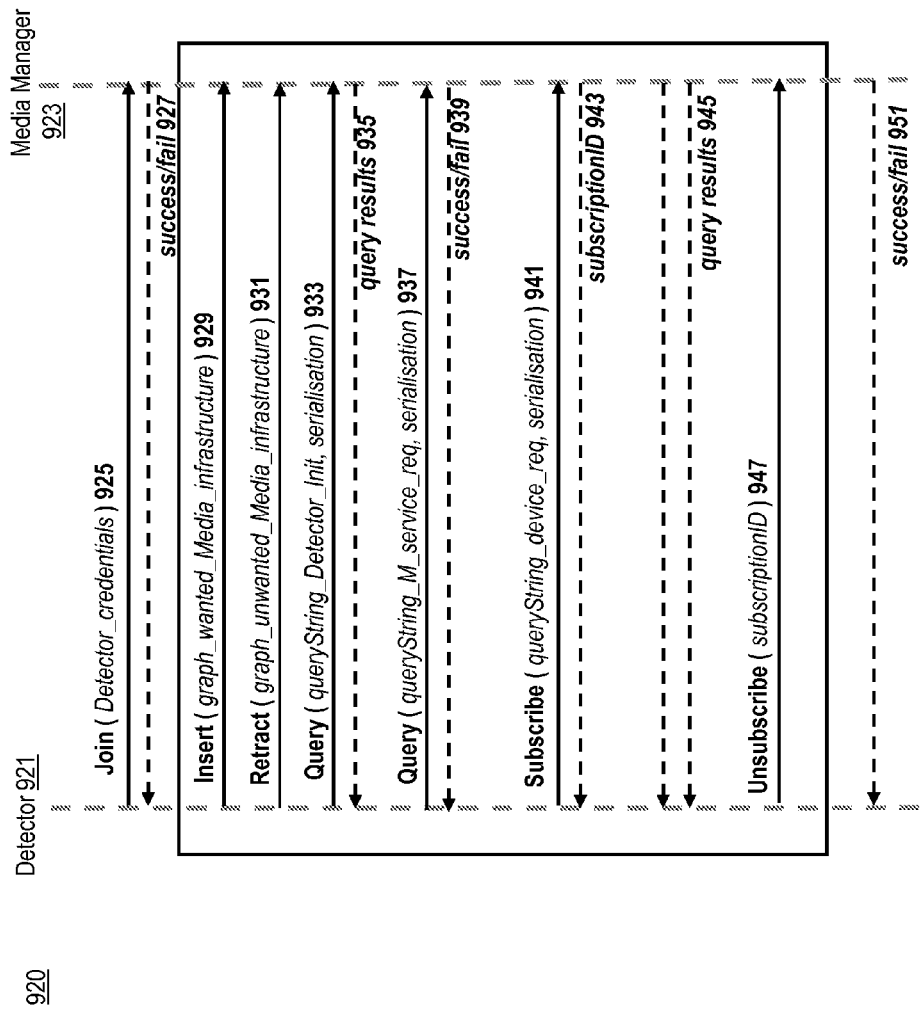
FIG. 9B is an operational diagram of a detector interacting with a media manager in a media management framework, according to one embodiment.

FIG. 9B is an operational diagram 920 of a detector interacting with a media manager in a media management framework, according to one embodiment. In one embodiment, the detector 921 joins in the media management framework by interacting with the media manager 923 or an associated semantic information broker to define available media devices for pre-processing and presenting and to select the best set of devices for presenting the requested media content to the user. The interaction involves various smart space operational commands. The interaction starts with sending a Join command: Join(Detector_credentials) embedded with the credentials of the detector 921 from the detector 921 to the media manager 923 in an operation 925. The media manager 923 replies to the detector 921 with an indication of success or fail in an operation 927. The detector 921 inserts RDF graphs representing wanted media devices (including pre-processing and presenting devices, aka "infrastructure") that are available and capable for certain functions into the smart space with an Insert command: Insert(graph_wanted_Media_infrastructure) in an operation 929. The detector 921 also retracts RDF graphs representing unwanted media devices into the smart space with a Retract command: Retract (graph_unwanted_Media_infrastructure) in an operation 931.

The detector 921 further queries RDF graphs representing capabilities of media devices into the smart space with a Query command: Query (queryString_Detector_Init, serialisation) in an operation 933. In particular, the query is in a String Detector mode which requires that all query results to be sting along (i.e., serialized) as a carousel to be sent to the director 923. The media manager 923 replies to the detector 921 with the query results in the require mode in an operation 935.

The detector 921 further queries RDF graphs representing requests for media content services into the smart space with a Query command: Query (queryString_M_service_req, serialisation) in an operation 937. The media manager 923 replies to the detector 921 with an indication of success or fail in an operation 939.

The detector 921 further subscribes to the query results (i.e., a persistent query such that a change in the query results is communicated to the detector) with a Subscribe command: Subscribe (queryString_device_req, serialisation) in an operation 941. The subscription is also in a String Detector mode which requires that all query results to be sting along (i.e., serialized) as a carousel. The media manager 923 replies to the detector 921 with a subscription ID in an operation 943. Thereafter, the media manager 923 updates the detector 921 query results in the require mode in an operation 945, whenever there is a change to the query results.

When the detector 921 decides to unsubscribe, it sends out an Unsubscribe command: Unsubscribe (subscriptionID) in an operation 947. The media manager 923 replies to the detector 921 with an indication of success or fail in an operation 951.

Figure 10:
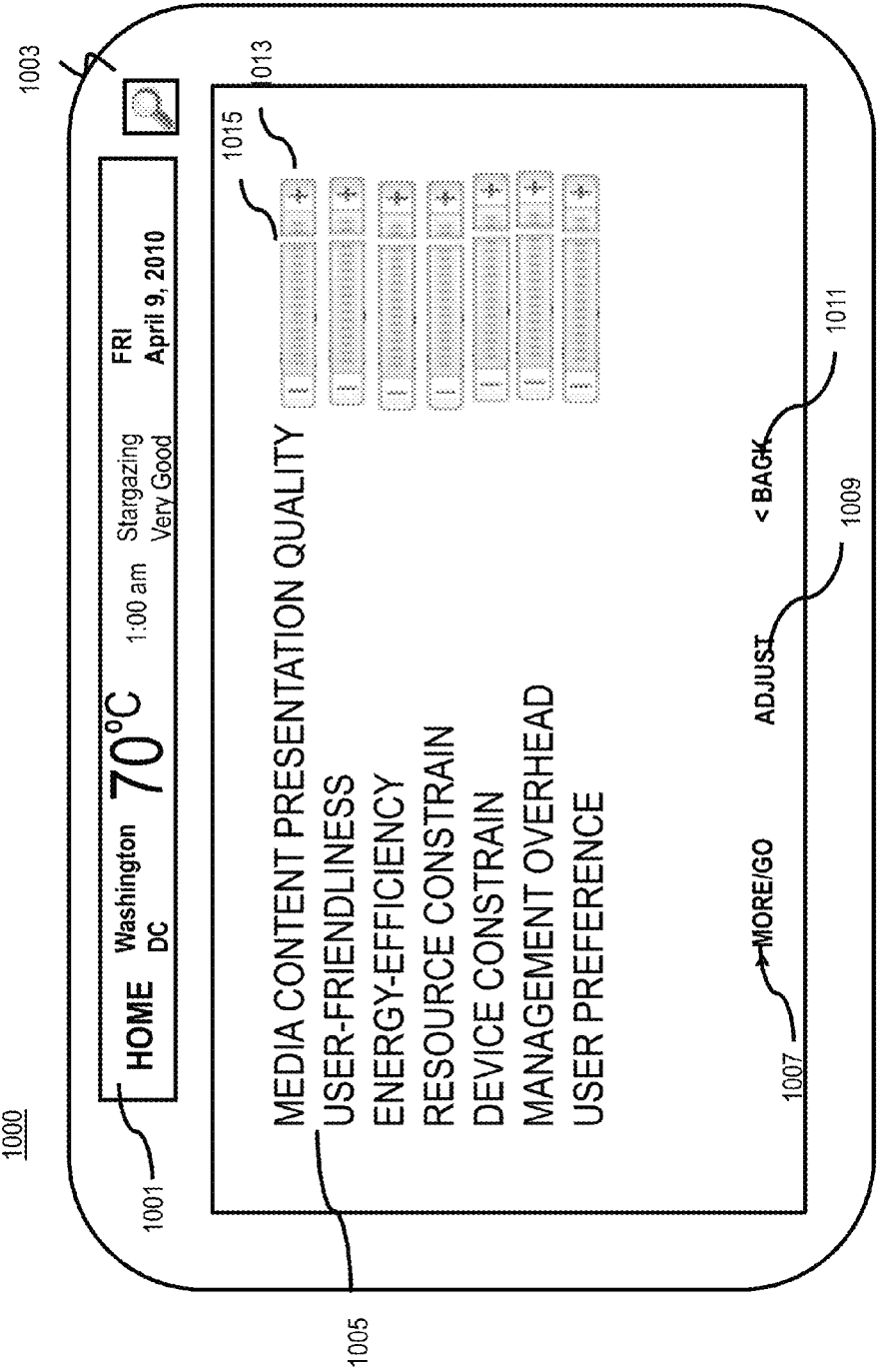
FIG. 10 is diagram of a user interface presenting media content optimization performance, according to one embodiment.

FIG. 10 is diagram of a user interface 1000 presenting media content optimization performance, according to one embodiment. The user interface may be a LCD screen, such as a touch screen, etc. In this embodiment, the media management framework automatically updates the context of user, and continuously updates the list of media content optimization performance. A top bar 1001 indicates a current location (Washington D.C.), temperature (70° F.), time (1:00 am), stargazing condition (very good), and date (Friday, Apr. 9, 2010). The stargazing forecast considers weather conditions and the lunar cycle to forecast the peak evenings for amateur astronomy.

A list of optimization performance of different parameters (e.g., media content presentation quality, user-friendliness, user preference, energy-efficiency, resource constrain, device constrain, management overhead, cost, or a combination thereof) is always ready to be called up by the user. By way of example, when the user walks out of a home theater to the balcony to view live stars, the user may select (by touching, clicking, etc.) an icon 1003 to display a list of optimization performance parameters 1005 assembled by the media management framework that have changes due to the switch of viewing environments. In this case, the user does not have to take any action other than selecting the icon 1003 to see the list of optimization performance parameters 1005.

In one embodiment, a pop-up window with a short description of a performance parameter is opened by touch the text of the performance parameter, such as "MEDIA CONTENT PRESENTATION QUALITY". By selecting a desired performance parameter, it is highlighted and/or enlarged, such that the user may select a "MORE/GO" icon/button 1007 to display more a detailed description of the performance parameter. The user can manually adjust a performance parameter by selecting "ADJUST" 1009. By way of example, the user can adjust the performance parameter "MEDIA CONTENT PRESENTATION QUALITY" by moving left and right of a lever 1015 in a performance bar 1013. The user can move back to the prior screen by selecting "BACK" 1011.

In this way, the user explicitly indicates the user's preference with respect to the media content management performance. The user's selection or other feedback is monitored by the media management framework as implicit relevance feedback with respect to the media management service. Therefore, the media management framework refines/trains itself to provide a better media management service meeting the user's need and preference.

In addition to detecting content scheduling and availability as well as optimizing media content delivery, the media management framework also supports digital rights management (DRM) content protection. The media management framework can enforce DRM via KPs 201 and SIBs 103, without encrypting interconnections between devices as implemented by the existing Digital Transmission Content Protection (DTCP).

By way of example, the user requests astronomical multimedia services that will be coordinated by the media manager 501. One of the astronomical multimedia services is a "StarPedia" service that presents to the user a scheme of stars in the sky observable at any given time and location. A current time and location of the user are selected by default based on time and geo-data of a location SIB 307. An important feature of the service is that the orientation of the star scheme is set in line with the current orientation of a user device 101 (e.g., a smart phone, PDA, etc.), so that it is easy for the user to map observable stars to the constellations and stars on the scheme, by using compass information in the location SIB 307. In another embodiment, by pointing a joystick cursor to an internal area of the constellation on the screen of the user device 101, the user gets information of the internal area, information of main stars in the internal area which form that constellation, and other related reference information (e.g., Ancient Greek myth about the stars). The information is stored in the SIBs 103 of the smart space 100, and can be easily updated from external SIBs 307, library servers, and other resources of multimedia content when needed. By pointing to a particular star on the scheme, the user gets all main facts about the star, including a name, brightness, distance, etc. A number of KPs 303 can be each used as an extension of the above-described functions, depending on user preferences. For example, short cartoons about Greek myth may be played for children, for them to remember a story behind names of the constellations and how they look on the sky. The short cartoons can be played at proper time and using the best set of devices, e.g., a laptop panel on site.

Another one of the astronomical multimedia services is a "stars-identifier" service. With this service, the user points a camera of the user device 101 to the stars, which results in corresponding change of the view of the star sky scheme on the screen. Data is retrieved from motion, compass and other sensors of the user device or form an SIB 307. The sensor data allow accurately defining the direction and the angle under which the camera is pointing to the sky. The direction and the angle can simplify and speed up recognition of images received from the camera in order to minimize processing time and to provide synchronous view movement in the star sky scheme. The user simply points the device 101 to a certain star in the sky and gets all relevant multimedia content, including pictures, documentary movies, etc. The media content (which can be live) can be presented in real time based upon available and applicable devices 101, or delayed for a later presentation. The delayed media content can be independently presented or presented as a part of information flow in other user applications. By way of example, when the user later starts a crossword puzzle application which is embedded with the words and facts corresponding to some pointed/observed stars, the relevant media content is automatically selected and presented in conjunction with the crossword puzzle.

The astronomical multimedia services also include a service of a "virtual telescope". While the user is using the StarPedia or stars-identifier service, the user can select (by touching, clicking, etc.) a Zoom function to switch the user device into the virtual telescope service for an earlier selected area in the star sky. The virtual telescope service finds and/or requests the corresponding latest multimedia content of the selected area, including images from content providers (e.g., NASA, Russian Federal Space Agency, observatories, etc.), telescope models, and so on. The user thus accesses to live astronomic content (images of galaxies, planets and moons in high resolution, etc.) at the given time. The virtual telescope service turns the user device or any selected presenting device into a virtual telescope that emulates a telescope without requiring accurate placing and handling as for an actual telescope. This service also provides the user the feeling of "taking" photos of the far away stars and galaxies as using a mobile phone camera, with high quality from the best telescopes of the world and even from the orbit (such as images of craters on the Moon surface). The user can select an image on the screen of the user device a number of times to receive a number of actual pictures from different physical telescopes.

The astronomical multimedia services further include a service of archiving images of the stars sky. Due to small changes in the sky during individual lifetime, the archived images may be very similar, within resolution of the user device screen. However, a request for a live image of a given sector of the sky and the user coordinates is forwarded to a global astronomical smart space. The astronomical smart space finds the closest content provider of the requested content (e.g., a professional or personal telescope pointing to the same area of the sky at this time), with a predetermined error tolerance which considers user device sensor accuracy and presenting device output quality. The astronomical smart space calculates a shift of the area of interest depending on its own location and a current location of the user, and provides content to the user accordingly.

The above-described embodiments can be applied to view media presentations in person on stage, projected, transmitted, or played locally with user devices. A broadcast of media presentations may be a live, recorded, or a combination thereof using analog and/or digital electronic media technology. Digital online multimedia may be downloaded or streamed (live or on-demand). The above-described embodiments can provide media games and simulations in a physical environment using offline devices, game systems, or simulators with special effects, to multiple users in an online network or locally. In addition to applications in entertainment, education, and business, the above-described embodiments can be used in various areas including, but not limited to, news, art, cinema, opera, engineering, medicine, mathematics, scientific research, advertisements, governmental services and nonprofit services, etc.

The involved service and content providers can charge fees for the media content services (e.g., astronomical multimedia services). In another embodiment, the astronomical multimedia services are implemented as a smart space extension of the existing positioning services, e.g., a map service, a navigation service, etc. to be deployed on existing user devices. As the capabilities of user devices increase, more star-dots and their brightness can be presented by the user devices.

The emergence of the cloud and other information spaces (e.g., smart spaces), provides means for controlling and/or coordinating among different user devices to provide optimal media services. The above-described embodiments provide an efficient means for handling media content in smart spaces and maximize user experience based upon the optimal set of user devices. In addition, new types of media content services are provided to address user demand of live and dynamic media content provision, such as astronomical multimedia services, as useful educational and research tools.

The processes described herein for coordinating media presentation on devices via an information space may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
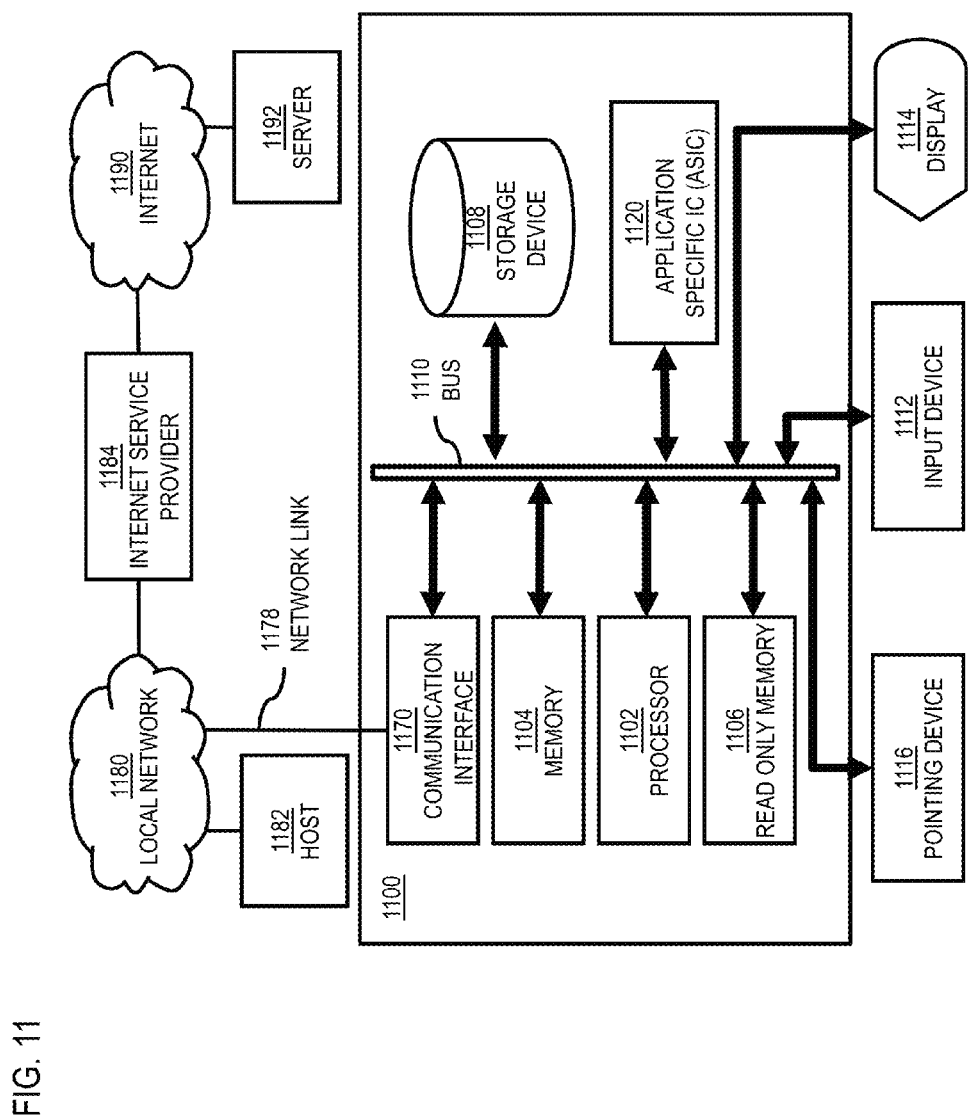
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to coordinate media presentation on devices via an information space as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of coordinating media presentation on devices via an information space.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to coordinate media presentation on devices via an information space. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for coordinating media presentation on devices via an information space. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for coordinating media presentation on devices via an information space, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection from the user device to the information space.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to coordinate media presentation on devices via an information space as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of services. Chip set or chip 1200, or a portion thereof, constitutes a means for performing one or more steps of coordinating media presentation on devices via an information space.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to coordinate media presentation on devices via an information space. The memory 1205 also stores the data associated with or generated by the execution of the inventive steps.

FIG. 13 is a diagram of exemplary components of a mobile terminal (e.g., handset) for communications, which is capable of operating in the system of FIG. 1, according to one embodiment. In some embodiments, mobile terminal 1300, or a portion thereof, constitutes a means for performing one or more steps of coordinating media presentation on devices via an information space. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of coordinating media presentation on devices via an information space. The display 13 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to coordinate media presentation on devices via an information space. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   in response to a request for presentation of media content, retrieving from an information space raw media content corresponding to the request, wherein the information space has a logical architecture that includes semantic information brokers interoperable across a plurality of platforms connected via communication networks to operate globally;
   determining one or more media support indicators associated with one or more portions of the media content, wherein the one or more media support indicators are expressed with one or more resource description framework graphs;
   determining, via a portion of the semantic information brokers, one or more first devices for pre-processing one or more portions of the raw media content based, at least in part, on the one or more media support indicators; and
   determining, via another portion of the semantic information brokers, one or more second devices for presenting one or more portions of the pre-processed media content based upon respective presentation environments, technical capabilities and availabilities of the first devices, the second devices, or a combination thereof, expressed with one or more other resource description framework graphs, wherein the first and second devices are connected via the portions of the semantic information brokers to the information space.

2. A method of claim 1, further comprising:
   causing, at least in part, transmission of the one or more portions of the raw media content to the determined first devices for pre-processing; and
   causing, at least in part, receiving and then forwarding the pre-processed one or more portions of the media content to the determined second devices for presenting,
   wherein the plurality of platforms are composed by devices connected thereto globally, wherein the devices include the first devices and the second devices,
   the semantic information brokers store and share respective presentation environments, technical capabilities and availabilities of the devices, and
   the presentation environments include temperature, weather, or a combination thereof, of the first devices, the second devices, or a combination thereof.

3. A method of claim 1, wherein the one or more portions of the raw media content are pre-processed to adapt to characteristics of the media content, the second devices, or a combination thereof, the characteristics include quality, coding, data format, or a combination thereof, and
   the media content includes one or more advance virtual telescopes, one or more augmented virtuality games, one or more virtual reality trainings, one or more virtual reality therapies, or a combination thereof, that are expressed with one or more resource description framework graphs.

4. A method of claim 1, further comprising:
   receiving the request for presentation of media content that is expressed with one or more resource description framework graphs and inserted in the information space; and
   detecting whether the one or more first devices and the one or more second devices are available.

5. A method of claim 1, further comprising:
   selecting one or more media content resources for the requested media content;
   preparing and sending respective media content requests to the one or more media resource, depending upon a format, organization, access restriction, or a combination thereof of the media content resources; and
   receiving media content collected by the media resource access.

6. A method of claim 4, further comprising:
   inserting in the information space one or more requests for technical specification data, cost factor, or a combination thereof of each of the first and second devices, thereby determining a set of first and second devices for optimizing presentation of the media content;
   subscribing to one or more changes of results of the one or more requests; and
   updating the technical specification data, cost factor, or a combination thereof based on the one or more changes,
   wherein the one or more requests, the results of the one or more requests, the one or more changes, or a combination thereof, are expressed with one or more resource description framework graphs, and the results are serialized as one carousel.

7. A method of claim 1, wherein the technical capabilities include media content presentation quality, user-friendliness, user preference, energy-efficiency, resource constrain, device constrain, management overhead, cost, or a combination thereof expressed with one or more resource description framework graphs, and the method further comprising:
   causing, at least in part, presentation of one or more levers in one or more performance bars on a use interface of one or more of the first devices, one or more of the second devices, or a combination thereof, for selectively adjusting the technical capabilities.

8. An apparatus comprising:
at least one processor; and
at least one memory including computer program code for one or more computer programs,
the at least one memory and the computer program code configured to, with the at least one processor, cause the apparatus to perform at least the following,
in response to a request for presentation of media content, retrieve from an information space raw media content corresponding to the request, wherein the information space has a logical architecture that includes semantic information brokers interoperable across a plurality of platforms connected via communication networks to operate globally;
determine one or more media support indicators associated with one or more portions of the media content, wherein the one or more media support indicators are expressed with one or more resource description framework graphs;
determine, via a portion of the semantic information brokers, one or more first devices for pre-processing one or more portions of the raw media content based, at least in part, on the one or more media support indicators; and
determine, via another portion of the semantic information brokers, one or more second devices for presenting one or more portions of the pre-processed media content based upon respective presentation environments, technical capabilities and availabilities of the first devices, the second devices, or a combination thereof, expressed with one or more other resource description framework graphs, wherein the first and second devices are connected via the portions of the semantic information brokers to the information space.

9. An apparatus of claim 8, wherein the apparatus is further caused to:
cause, at least in part, transmission of the one or more portions of the raw media content to the determined first devices for pre-processing; and
cause, at least in part, receiving and then forwarding the pre-processed one or more portions of the media content to the determined second devices for presenting.

10. An apparatus of claim 8, wherein the one or more portions of the raw media content are pre-processed to adapt to characteristics of the media content, the second devices, or a combination thereof, the characteristics include quality, coding, data format, or a combination thereof.

11. An apparatus of claim 8, wherein the apparatus is further caused to:
detect whether the one or more first devices and the one or more second devices are available.

12. An apparatus of claim 8, wherein the apparatus is further caused to:
select one or more media content resources for the requested media content;
prepare and sending respective media content requests to the one or more media resource, depending upon a format, organization, access restriction, or a combination thereof of the media content resources; and
receive media content collected by the media resource access.

13. An apparatus of claim 8, wherein the apparatus is further caused to:
request technical specification data, cost factor, or a combination thereof of each of the first and second devices, thereby determining a set of first and second devices for optimizing presentation of the media content.

14. An apparatus of claim 8, technical capabilities include media content presentation quality, user-friendliness, user preference, energy-efficiency, resource constrain, device constrain, management overhead, cost, or a combination thereof.

15. A non-transitory computer-readable storage medium carrying one or more sequences of one or more instructions which, when executed by one or more processors, cause an apparatus to at least perform the following steps:
in response to a request for presentation of media content, retrieving from an information space raw media content corresponding to the request, wherein the information space has a logical architecture that includes semantic information brokers interoperable across a plurality of platforms connected via communication networks to operate globally;
determining one or more media support indicators associated with one or more portions of the media content, wherein the one or more media support indicators are expressed with one or more resource description framework graphs;
determining, via a portion of the semantic information brokers, one or more first devices for pre-processing one or more portions of the raw media content based, at least in part, on the one or more media support indicators; and
determining, via another portion of the semantic information brokers, one or more second devices for presenting one or more portions of the pre-processed media content based upon respective presentation environments, technical capabilities and availabilities of the first devices, the second devices, or a combination thereof, expressed with one or more other resource description framework graphs, wherein the first and second devices are connected via the portions of the semantic information brokers to the information space.

16. A non-transitory computer-readable storage medium of claim 15, wherein the apparatus is caused to further perform:
causing, at least in part, transmission of the one or more portions of the raw media content to the determined first devices for pre-processing; and
causing, at least in part, receiving and then forwarding the pre-processed one or more portions of the media content to the determined second devices for presenting.

17. A non-transitory computer-readable storage medium of claim 15, wherein the one or more portions of the raw media content are pre-processed to adapt to characteristics of the media content, the second devices, or a combination thereof, the characteristics include quality, coding, data format, or a combination thereof.

18. A non-transitory computer-readable storage medium of claim 15, wherein the apparatus is caused to further perform:
detecting whether the one or more first devices and the one or more second devices are available.

19. A non-transitory computer-readable storage medium of claim 15, wherein the apparatus is caused to further perform:
selecting one or more media content resources for the requested media content;
preparing and sending respective media content requests to the one or more media resource, depending upon a format, organization, access restriction, or a combination thereof of the media content resources; and
receiving media content collected by the media resource access.

20. A non-transitory computer-readable storage medium of claim 15, wherein the apparatus is caused to further perform:

requesting technical specification data, cost factor, or a combination thereof of each of the first and second devices, thereby determining a set of first and second devices for optimizing presentation of the media content.

* * * * *